US008641813B2

(12) United States Patent
Gysling

(10) Patent No.: US 8,641,813 B2
(45) Date of Patent: Feb. 4, 2014

(54) SYSTEM AND METHOD FOR OPTIMIZING A GAS/LIQUID SEPARATION PROCESS

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 1133 days.

(21) Appl. No.: 11/483,025

(22) Filed: Jul. 7, 2006

(65) Prior Publication Data

US 2007/0006727 A1    Jan. 11, 2007

Related U.S. Application Data

(60) Provisional application No. 60/760,845, filed on Jan. 19, 2006, provisional application No. 60/759,159, filed on Jan. 12, 2006, provisional application No. 60/758,382, filed on Jan. 11, 2006, provisional application No. 60/724,952, filed on Oct. 6, 2005, provisional application No. 60/697,479, filed on Jul. 7, 2005, provisional application No. 60/762,101, filed on Jan. 24, 2006, provisional application No. 60/773,146, filed on Feb. 13, 2006, provisional application No. 60/774,706, filed on Feb. 17, 2006, provisional application No. 60/818,199, filed on Jun. 30, 2006.

(51) Int. Cl.
    *B01D 49/00* (2006.01)
(52) U.S. Cl.
    USPC ............... 96/417; 96/238; 96/128; 73/861.04
(58) Field of Classification Search
    USPC ............................... 96/238, 1, 128; 73/861.04
    See application file for complete search history.

(56) References Cited

U.S. PATENT DOCUMENTS

| 3,715,709 A | 2/1973 | Zacharias et al. |
| 3,751,979 A | 8/1973 | Ims |
| 3,781,895 A | 12/1973 | Monser |
| 3,851,521 A | 12/1974 | Ottenstein |
| 3,885,432 A | 5/1975 | Herzl |

(Continued)

FOREIGN PATENT DOCUMENTS

| DE | 4306119 | 9/1994 |
| EP | 0290336 | 11/1988 |

(Continued)

OTHER PUBLICATIONS

The American Heritage Dictionary of the English Language: Fourth Edition 2000.*

(Continued)

*Primary Examiner* — Jason M Greene
*Assistant Examiner* — Anthony Shumate

(57) ABSTRACT

A system and method for optimizing the gas/liquid separation process for a fluid flowing within a pipe is provided, wherein the method includes receiving a fluid flow having a liquid component and a gas component. The method further includes separating the liquid component from the gas component, wherein the liquid component is separated from the gas component via a separator device. The method also includes generating gas component data and liquid component data, wherein the gas component data is responsive to the liquid carry-over into the gas component and wherein the liquid component data is responsive to the gas carry-under into the liquid component. Furthermore, the method includes processing the gas component data and the liquid component data to generate apparatus optimization data.

3 Claims, 21 Drawing Sheets

(56) References Cited

U.S. PATENT DOCUMENTS

| | | |
|---|---|---|
| 3,952,578 A | 4/1976 | Jacobs |
| 4,004,461 A | 1/1977 | Lynnworth |
| 4,032,259 A | 6/1977 | Brown |
| 4,048,853 A | 9/1977 | Smith et al. |
| 4,080,837 A | 3/1978 | Alexander et al. |
| 4,195,517 A | 4/1980 | Kalinoski et al. |
| 4,236,406 A * | 12/1980 | Reed et al. ............... 73/61.45 |
| 4,248,085 A | 2/1981 | Coulthard |
| 4,320,659 A | 3/1982 | Lynnworth et al. |
| 4,445,389 A | 5/1984 | Potzick et al. |
| 4,520,320 A | 5/1985 | Potzick et al. |
| 4,532,812 A * | 8/1985 | Birchak ............... 73/861.27 |
| 4,561,310 A | 12/1985 | Barnard et al. |
| 4,576,043 A | 3/1986 | Nguyen |
| 4,677,305 A | 6/1987 | Ellinger |
| 4,717,159 A | 1/1988 | Alston et al. |
| 4,896,540 A | 1/1990 | Shakkottai et al. |
| 4,932,262 A | 6/1990 | Wlodarczyk |
| 5,040,415 A | 8/1991 | Barkhoudarian |
| 5,060,506 A | 10/1991 | Douglas |
| 5,083,452 A | 1/1992 | Hope |
| 5,115,670 A | 5/1992 | Shen |
| 5,218,197 A | 6/1993 | Carroll |
| 5,285,675 A | 2/1994 | Colgate et al. |
| 5,289,726 A | 3/1994 | Miau et al. |
| 5,359,897 A | 11/1994 | Hamstead et al. |
| 5,363,342 A | 11/1994 | Layton et al. |
| 5,367,911 A | 11/1994 | Jewell et al. |
| 5,398,542 A | 3/1995 | Vasbinder |
| 5,414,048 A | 5/1995 | Eian |
| 2,874,568 A | 12/1995 | Petermann |
| 5,524,475 A | 6/1996 | Kopak et al. |
| 5,526,844 A | 6/1996 | Kamen et al. |
| 5,551,305 A | 9/1996 | Farchi et al. |
| 5,591,922 A | 1/1997 | Segeral et al. |
| 5,600,073 A * | 2/1997 | Hill ............... 73/861.04 |
| 5,625,140 A | 4/1997 | Cadet et al. |
| 5,708,211 A | 1/1998 | Jepson et al. |
| 5,719,329 A * | 2/1998 | Jepson et al. ............... 73/61.49 |
| 5,741,980 A | 4/1998 | Hill et al. |
| 5,770,805 A | 6/1998 | Castel |
| 5,770,806 A | 6/1998 | Hiismaki |
| 5,835,884 A | 11/1998 | Brown |
| 5,845,033 A | 12/1998 | Berthold et al. |
| 5,856,622 A | 1/1999 | Yamamoto et al. |
| 5,948,959 A | 9/1999 | Peloquin |
| 6,004,385 A * | 12/1999 | Birmingham ............... 96/174 |
| 6,016,702 A | 1/2000 | Maron |
| 6,032,539 A * | 3/2000 | Liu et al. ............... 73/861.04 |
| 6,134,951 A * | 10/2000 | Scott et al. ............... 73/61.44 |
| 6,151,958 A | 11/2000 | Letton et al. |
| 6,202,494 B1 | 3/2001 | Riebel et al. |
| 6,233,374 B1 | 5/2001 | Ogle et al. |
| 6,261,232 B1 | 7/2001 | Yokosawa et al. |
| 6,345,539 B1 | 2/2002 | Rawes et al. |
| 6,349,599 B1 | 2/2002 | Lynnworth et al. |
| 6,354,147 B1 | 3/2002 | Gysling et al. |
| 6,378,357 B1 | 4/2002 | Han et al. |
| 6,397,683 B1 | 6/2002 | Hagenmeyer et al. |
| 6,412,353 B1 | 7/2002 | Kleven et al. |
| 6,435,030 B1 | 8/2002 | Gysling et al. |
| 6,442,996 B1 | 9/2002 | Thurston et al. |
| 6,443,226 B1 | 9/2002 | Diener et al. |
| 6,450,037 B1 | 9/2002 | MdGuinn et al. |
| 6,463,813 B1 | 10/2002 | Gysling |
| 6,532,827 B1 | 3/2003 | Ohnishi |
| 6,536,291 B1 | 3/2003 | Gysling et al. |
| 6,550,342 B2 | 4/2003 | Croteau et al. |
| 6,558,036 B2 | 5/2003 | Gysling et al. |
| 6,587,798 B2 | 7/2003 | Kersey et al. |
| 6,601,005 B1 | 7/2003 | Eryurek et al. |
| 6,601,458 B1 | 8/2003 | Gysling et al. |
| 6,609,069 B2 | 8/2003 | Gysling |
| 6,658,945 B1 | 12/2003 | Kleven |
| 6,672,163 B2 | 1/2004 | Han et al. |
| 6,691,584 B2 | 2/2004 | Gysling et al. |
| 6,698,297 B2 | 3/2004 | Gysling et al. |
| 6,732,575 B2 | 5/2004 | Gysling et al. |
| 6,773,603 B2 | 8/2004 | Moorehead et al. |
| 6,782,150 B2 | 8/2004 | Davis et al. |
| 6,790,256 B2 * | 9/2004 | Means ............... 95/1 |
| 6,813,962 B2 | 11/2004 | Gysling et al. |
| 6,837,098 B2 | 1/2005 | Gysling et al. |
| 6,837,332 B1 | 1/2005 | Rodney |
| 6,862,920 B2 | 3/2005 | Gysling et al. |
| 6,868,737 B2 | 3/2005 | Croteau et al. |
| 6,889,562 B2 | 5/2005 | Gysling et al. |
| 6,898,541 B2 | 5/2005 | Gysling et al. |
| 6,945,095 B2 | 9/2005 | Johansen |
| 6,959,604 B2 | 11/2005 | Davis et al. |
| 6,971,259 B2 | 12/2005 | Gysling |
| 6,988,411 B2 | 1/2006 | Gysling et al. |
| 7,032,432 B2 | 4/2006 | Gysling et al. |
| 7,058,549 B2 | 6/2006 | Gysling et al. |
| 7,062,976 B2 | 6/2006 | Gysling et al. |
| 7,086,278 B2 | 8/2006 | Gysling et al. |
| 7,096,719 B2 | 8/2006 | Gysling |
| 7,110,893 B2 | 9/2006 | Davis et al. |
| 7,121,152 B2 | 10/2006 | Currey et al. |
| 7,127,360 B2 | 10/2006 | Davis et al. |
| 7,134,320 B2 | 11/2006 | Banach et al. |
| 7,139,667 B2 | 11/2006 | Gysling et al. |
| 7,181,955 B2 | 2/2007 | Gysling |
| 2001/0020603 A1 | 9/2001 | Moorehead et al. |
| 2002/0064331 A1 | 5/2002 | Davis et al. |
| 2002/0095263 A1 | 7/2002 | Gysling |
| 2002/0123852 A1 | 9/2002 | Gysling et al. |
| 2002/0129662 A1 | 9/2002 | Gysling et al. |
| 2003/0038231 A1 | 2/2003 | Bryant et al. |
| 2003/0089161 A1 | 5/2003 | Gysling |
| 2003/0136186 A1 | 7/2003 | Gysling et al. |
| 2003/0154036 A1 | 8/2003 | Gysling et al. |
| 2003/0159986 A1 * | 8/2003 | Amado et al. ............... 210/521 |
| 2004/0006409 A1 | 1/2004 | Lijienberg et al. |
| 2004/0016284 A1 | 1/2004 | Gysling et al. |
| 2004/0069069 A1 | 4/2004 | Gysling |
| 2004/0074312 A1 | 4/2004 | Gysling |
| 2004/0144182 A1 | 7/2004 | Gysling et al. |
| 2004/0167735 A1 | 8/2004 | Rothman et al. |
| 2004/0168522 A1 | 9/2004 | Bailey et al. |
| 2004/0168523 A1 | 9/2004 | Bailey et al. |
| 2004/0194539 A1 | 10/2004 | Gysling |
| 2004/0199340 A1 | 10/2004 | Gysling al. |
| 2004/0199341 A1 | 10/2004 | Gysling et al. |
| 2004/0210404 A1 | 10/2004 | Gysling et al. |
| 2004/0226386 A1 | 11/2004 | Croteau et al. |
| 2004/0231431 A1 | 11/2004 | Bailey et al. |
| 2004/0255695 A1 | 12/2004 | Gysling |
| 2005/0000289 A1 | 1/2005 | Gysling et al. |
| 2005/0005711 A1 | 1/2005 | Gysling et al. |
| 2005/0005712 A1 | 1/2005 | Gysling et al. |
| 2005/0005713 A1 | 1/2005 | Winston et al. |
| 2005/0011258 A1 | 1/2005 | Gysling et al. |
| 2005/0011278 A1 | 1/2005 | Brown et al. |
| 2005/0011283 A1 | 1/2005 | Gysling et al. |
| 2005/0011284 A1 | 1/2005 | Davis et al. |
| 2005/0012935 A1 | 1/2005 | Kersey |
| 2005/0033545 A1 | 2/2005 | Gysling |
| 2005/0039520 A1 | 2/2005 | Davis et al. |
| 2005/0044929 A1 | 3/2005 | Gysling et al. |
| 2005/0044966 A1 | 3/2005 | Croteau et al. |
| 2005/0050956 A1 | 3/2005 | Gysling et al. |
| 2005/0061060 A1 | 3/2005 | Banach et al. |
| 2005/0072216 A1 | 4/2005 | Engel |
| 2005/0120799 A1 | 6/2005 | Gysling et al. |
| 2005/0125166 A1 | 6/2005 | Loose et al. |
| 2005/0125170 A1 | 6/2005 | Gysling |
| 2005/0159904 A1 | 7/2005 | Loose et al. |
| 2005/0171710 A1 | 8/2005 | Gysling et al. |

FOREIGN PATENT DOCUMENTS

| | | |
|---|---|---|
| EP | 1186868 | 3/2002 |
| GB | 1208121 | 10/1970 |

(56) References Cited

FOREIGN PATENT DOCUMENTS

| | | |
|---|---|---|
| GB | 2210169 | 6/1989 |
| GB | 2337011 | 11/1999 |
| WO | WO 93/14382 | 7/1993 |
| WO | WO 9319347 | 9/1993 |
| WO | WO 99/67629 | 12/1999 |
| WO | WO 00/00793 | 1/2000 |
| WO | WO 00/46583 | 8/2000 |
| WO | WO 01/02810 | 1/2001 |
| WO | WO 02/46706 | 6/2002 |
| WO | WO 02/50511 | 6/2002 |
| WO | WO 03073047 | 9/2003 |
| WO | WO 2004/063741 | 7/2004 |
| WO | WO 2005/040732 | 5/2005 |

OTHER PUBLICATIONS

Webster's Third New International Dictionary, Unabridged 1993.*
"New Flowmeter Principle" by: Walt Boyes—Published in Flow Control Magazine—Oct. 2003 Issue.
"Piezoelectroc Polymers" By: J.S. Harrison and Z. Ounaies—ICASE Report.
Piezo Film Sensors Technical Manual—Measurements Specialities, Inc. Apr. 2, 1999.
Mass Fraction Measurements in Multiphase Flows Using a Clamp-On PVDF Array—Johan Carlson.
Sonar-Based Volumetric Flow Meter for Pulp and Paper Applications—Daniel L. Gysling & Duglas H. Loose Jan. 24, 2003.
Sonar Based Volumetric Flow Meter for Chemical and Petrochemical Applications—by Daniel L. Gysling & Douglas H. Loose Feb. 14, 2003.
Clamp-on, Sonar Based Entrained Air Measurement for Pulp and Paper Applications by Daniel L. Gysling and Douglas H. Loose Dec. 13, 2002.
"Flow Velocity Measurement Using Spatial Filter" by Yoshio Kurita, Takaharu Matsumoto and Yukitake Shibata, Nov. 1979.
SONAR Gets into the Flow—Daniel L. Gysling and Douglas H. Loose—Modern Process—Jan. 2004.
"Noise and Vibration Control Engineering pRinciples and Applications" by Leo L. Beranek and Istvan L. Ver, A. Wiley Interscience Publication, pp. 537-541, Aug. 1992.
"Two Decades of Array Signal Processing Research" The Parametric Approach by H. Krim and M. Viberg, IEEE Signal Processing Magazine, Jul. 1996, pp. 67-94.
"Development of an Array of Pressure Sensors with PVDF Film, Experiments in Fluids 26", Jan. 8, 1999, Springer-Verlag.
"Viscous Attenuation of Acoustic Waves in Suspensions" by R.L. Givson, Jr. and M.N. Toksoz.
"Flow Velocity Measurement Using Spatial Filter" Yoshio Kurita, Takaharu Matsumoto, Yukitake Shibata—Nov. 1979.

* cited by examiner

SYSTEM AND METHOD FOR OPTIMIZING A GAS/LIQUID SEPARATION PROCESS

CROSS-REFERENCE TO RELATED PATENT APPLICATIONS

This application claims the benefit of U.S. Provisional Patent Application No. 60/760,845 filed Jan. 19, 2006, U.S. Provisional Patent Application No. 60/759,159 filed Jan. 12, 2006; U.S. Provisional Patent Application No. 60/758,382 filed Jan. 11, 2006; U.S. Provisional Patent Application No. 60/724,952 filed Oct. 6, 2005; U.S. Provisional Patent Application No. 60/697,479 filed Jul. 7, 2005, U.S. Provisional Patent Application No. 60/762,101 filed Jan. 24, 2006; U.S. Provisional Patent Application No. 60/773,146 filed Feb. 13, 2006, U.S. Provisional Patent Application No. 60/774,706 filed Feb. 17, 2006, and U.S. Provisional Patent Application No. 60/818,199 filed Jun. 30, 2006, all of which are incorporated by reference herein in their entirety.

BACKGROUND OF THE INVENTION

Oil and Gas production involves the separation of the produced hydrocarbons into gas, oil, and water flows. This process involves numerous, cascaded separators, as shown in the article titled, *The Auger Platform Debottlenecking and Expansion of Fluid Handling Facilities*, written by T. R. Judd and C. B. Wallace (SPE 36584), which is incorporated herein by reference. Often, the overall production rate of a platform is limited by the ability to process, i.e. separate, the produced fluids.

The details of optimizing the separation process are complex and highly empirical. Although the residence time of a gas/liquid mixture within a settling vessel (i.e. a separator) has a large influence in the quality of the separation process, this quality is also typically influenced by other factors, such as the composition the mixture, the fluid properties and the internal components of the separation equipment. Often, numerous chemical additives are used at various stages in the process to aid in the separation process, such as demisters, defoamers and emulsifier breakers. Furthermore, the complete separation process involves multiple stages of separators, compressors, heater exchangers and possibly other equipment, with the performance of each stage having an impact on the performance of the next stage. All in all, it is a very complicated, empirical, yet critical process in oil and gas production. Unfortunately however, the ability to optimize this process, for say maximum oil production, is hindered by the inability to effectively monitor the efficiency, or quality of the separation process on a real time basis.

A fluid flow process (flow process) includes any process that involves the flow of fluid through pipe, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

In certain flow processes, such as those found in the oil and gas industries, it is desirable to separate liquid (e.g., oil and/or water) and gas (e.g., air) components of a fluid. This is typically accomplished using a separator, which is an item of production equipment used to separate liquid components of the fluid stream from gaseous components. The liquid and gas components flow from the separator in separate legs (pipes), with the leg containing the gas component referred to as the "gas leg" and the leg containing the liquid component referred to as the "liquid leg". Each of the legs typically includes a flow meter to determine the volumetric flow rate of the gas and fluid components, respectively, wherein the volumetric flow rate for the gas leg is commonly measured using an orifice plate. Additionally, the liquid leg may include a watercut meter for determining the percentage (or phase fraction) of water in the liquid flow to thereby determine the percentage of oil in the flow. In fact, in some separator configurations, the liquid components are separated into a "water leg" and an "oil leg".

As is well known in oil and gas production, the carry-over of liquid into the gas leg of a gas/liquid separator commonly occurs, wherein the liquid typically takes the form of a mist comprised of small liquid droplets. This is undesirable because the liquid carry-over can result in a host of undesirable events depending in large part on the degree of carry-over that takes place. As such, in order to minimize the amount of liquid carry-over most separators have mist catchers designed to recover the liquid carried over. Furthermore, the carry-under of gas into the liquid leg (or oil leg and water leg) of the gas/liquid separator also commonly occurs in oil and gas production, wherein the gas is typically comprised of small bubbles forming entrained gas in the liquid.

Currently, the vast majority of the world's oil production is allocated using separator-based measurements, wherein test separators are used to determine individual well production and high pressure production separators are often used to allocate production from individual fields prior to the commingling of produced fluids for further processing. The accuracy of these measurements is based on the assumption of complete separation of the gas and liquids phases. Thus, the separation of the oil, water, and gas phases is a critical step in the processing of the hydrocarbon production streams. Separator designs range from large, horizontal vessels for three-phase oil/water/gas separation to compact two-phase liquid/gas separators. In all cases, accurate well test and custody transfer measurements depend on the complete separation of the liquid and gas phase, however in practice 100% separation is frequently difficult or impractical to achieve. As such, a small, but unknown, level of gas in liquid lines is common and can result in significant measurement errors in both flow rate and water cut. Furthermore, since the oil exists in the separator at or near vapor pressure, additional out-gassing can occur at low pressure points in the downstream processes.

However, the measurement of oil production includes many variables ranging from varying crude oil properties, water cut, and gas-oil ratios to varying production rates, pressures, and temperatures. Given this variability associated with oil production, completely separating the gas and liquid phases prior to measurement often becomes difficult, if not impractical, to achieve. While the variable amounts of gas present during the measurement of the liquid phase and the variable amounts of liquid present during the measurement of the gas phase are often small, the presence of these secondary phases cause the vast majority of gas and liquid flow meters used in separator applications to over-report the amount of product flowing through the lines. In fact, errors due to incomplete separation are often the largest source of error in well and field allocations measurements, resulting in a distortion of the reservoirs engineer's view of well-by-well production and introducing systematic errors into the fiscal allocation of production. It is contemplated that by directly measuring and compensating for secondary phases in separator outflows, measurement errors due to incomplete separation can be avoided.

Liquid Outlet of the Liquid leg

The volume of liquid flowing through the liquid outlet is typically measured using turbine meters, positive displacement or Coriolis meters, wherein the accuracy of the liquid flow rate measurement depends in large part on the conditioning of the liquid stream. Unfortunately, entrained gases present in the liquid typically cause the primary flow measurement device to over-report the volumetric flow rate and, where applicable, under-report the liquid density. Thus, the presence of entrained gases within a flow meter on a liquid outlet can be traced to one of two primary sources, either gas carry-under and/or gas break-out. The first primary source, gas carry-under, generally results from the presence of small gas bubbles being entrained in the liquid as it leaves the separator. Due to the physics of gravity (or centrifugal) separation, typically, only the smallest bubbles are carried-under with the volume fraction of gas carried-under increasing with increasing flow rates through the separator. As mentioned above, the second primary source of entrained gas at the measurement location is due to gas-breakout. Ideally, liquids exit a separator at saturated conditions, i.e. provided sufficient residence time in the separator, all the gas that will come out of solution at separator pressure and temperature has done so when the fluid exits the separator. This liquid, however, can still contain significant amounts of dissolved gases which will typically continue to 'outgas' from the liquid with further decreases in pressure below the separator pressure. Additionally, the pressure losses due to flow through the piping prior to measurement and pressure losses due to the flow measurement device itself can lead to additional outgasing prior to measurement.

Gas Outlet for Gas Leg

Furthermore, the liquid carry-over in the gas outlet from the separator is typically in the form of small liquid droplets entrained in a mist and can vary in amount greatly, wherein estimates of 2% to 3% of the liquid inlet rate are not uncommon. The impact of liquid carry-over is two-fold. Firstly the liquid droplets can cause differential pressure-based (DP) gas flow meters, i.e. orifice plates, v-cones, venturi's, to over-report the gas flow rate in proportion to the wetness. Secondly, depending on the gas-oil ratios and other parameters, the liquid rates passing through the gas leg can be a meaningful percent of the total liquid rates.

Thus, in all separation scenarios the ability to accurately determine oil and water flow rates depends on both flow rate and water cut measurements, wherein the liquid flow rate is typically made with a turbine, positive displacement or coriolis meter and the water cut is commonly measured using microwave or coriolis density. The challenge is to maintain the accuracy of these measurements when gas bubbles exist in the liquid. Flow rate measurements will, at a minimum, over-report the liquid flow by an amount equal to the volume percent of the gas present. For example, a 1% by volume gas results in a 1% error in the flow rate measurement. Even after all of the processing steps that are completed prior to a fiscal transfer measurement point, several tenths or more of a percent gas can remain resulting in significant financial impact. Moreover, the water cut measurement error due to gas carry-under is often the single largest measurement source of error. For example, a density or microwave measurement will report a higher than actual oil fraction when entrained gas exists in the stream resulting in an over reporting of the oil rate and an inaccurate well test. Driven by goals to reduce the size and cost of separators, many operators are using smaller two-phase liquid/gas separation devices for determining oil and water flow rates. Unfortunately however, existing methods and systems are unable to achieve the desired results.

Therefore, there is a need for a system and method to quantify the measurement errors associated with each leg of a separator and provide an accurate measurement of the oil, water and gas output from a well head or multiphase input flow. As described in greater detail hereinafter, the present invention provides for an accurate and real time measurement of flow process parameters, such as the liquid carry-over and/or the gas carry-under. As such, the present invention allows for the control and/or optimization of the separation process via controlling the disbursement of deformer/demister and/or by maintaining the separator at a preferred level.

SUMMARY OF THE INVENTION

An apparatus for optimizing the gas/liquid separation process in a fluid flowing within a pipe is provided, wherein the apparatus includes a separator device communicated with the pipe to receive the fluid. The separator device separates the fluid into a gas component and a liquid component, wherein the gas component flows within a gas leg portion and wherein the liquid component flows within a liquid leg portion. A gas leg metering apparatus is also provided, wherein the gas leg metering apparatus is communicated with the gas component to generate gas component data responsive to the liquid carry-over into the gas component. A liquid leg metering apparatus is also provided, wherein the liquid leg metering apparatus is communicated with the liquid component to generate liquid component data responsive to the gas carry-under into the liquid component. Furthermore a processing device is provided wherein the processing device is communicated with the gas leg metering apparatus and the liquid leg metering apparatus such that the processing device receives and processes the gas component data and the liquid component data to generate apparatus optimization data.

A method for optimizing the gas/liquid separation process for a fluid flowing within a pipe is provided, wherein the method includes receiving a fluid flow having a liquid component and a gas component. The method further includes separating the liquid component from the gas component, wherein the liquid component is separated from the gas component via a separator device. The method also includes generating gas component data and liquid component data, wherein the gas component data is responsive to the liquid carry-over into the gas component and wherein the liquid component data is responsive to the gas carry-under into the liquid component. Furthermore, the method includes processing the gas component data and the liquid component data to generate apparatus optimization data.

An apparatus for optimizing the separation process in a fluid flowing within a pipe is provided, wherein the apparatus includes a separator device communicated with the pipe to receive the fluid, wherein the separator device separates the fluid into a first component and a second component. The apparatus further includes at least one metering device, the at least one metering device being associated with the separator to generate meter data responsive to at least one of the first component and the second component. Moreover, the apparatus includes a processing device, wherein the processing device is communicated with the at least one metering device to generate processor data responsive to the fluid.

BRIEF DESCRIPTION OF THE DRAWINGS

Referring now to the drawings, the foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

Figure 1A:
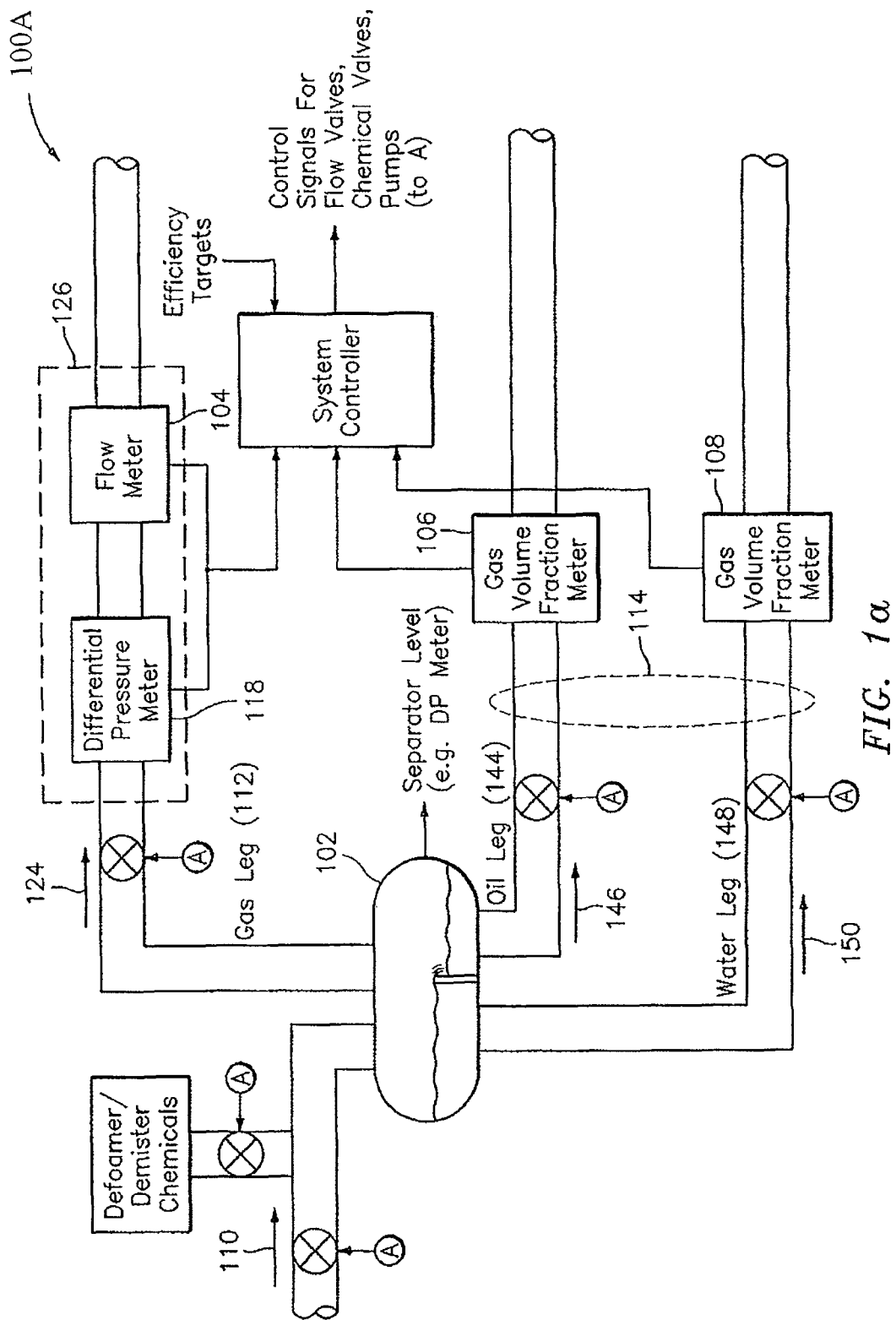
FIG. 1a is schematic diagram of a system for measuring the liquid carry-over and gas carry-under of a fluid separator having a gas leg, oil leg and a water leg, embodying the present invention.

Referring to FIG. 1a, a system 100A for measuring the liquid carry-over and gas carry-under for a fluid separator 102 in accordance with the present invention is shown and teaches the use of sonar flow meter 104 and Gas Volume Fraction (GVF) meters 106, 108 to monitor the separation effectiveness of each component in a separation train to optimize the performance of the overall system. As shown, the system, the system monitors the performance of each separator, controlling input rates, heat exchange performance, separators levels, chemical dosing, etc to ensure that each separator in the separation process remains within separator efficiency targets defined on a system level. It should be appreciated that while FIG. 1a illustrates the use of a single separator 102, the invention contemplates that the output of each of the flows cascades to a similar separation system, which may have a similar configuration of meters as shown herein, wherein the optimal performance could be maximum availability, i.e. avoid process upset, minimize chemical usages (i.e. lower costs), or maximize throughput. Moreover, the approach defines one or more separation efficiency metrics based on real time measurement of gas carry-under in the liquid leg(s) and liquid carry-over in the gas leg(s) as shown. For example, a separator meter can be defined as, $$\eta_{sep} \equiv 1 - \alpha(GVF) - \beta(LGMR), \quad \text{(Eqn. 1)}$$

where $\alpha$, and $\beta$ are functions to be defined, GVF is the entrained gas present in the liquid leg and LGMR is the liquid to gas mass ratio in the gas leg. These measurements can be obtained with sonar flow meters directly on the liquid leg and DP+sonar meters on the gas leg(s), as described hereinafter in greater detail. The concept could be further extended to include watercut in the liquid leg and/or to include three phase separators as well as two phase separators, also as shown in greater detail hereinafter. It should be appreciated that defoamers and demistors are widely used throughout the production of oil and gas.

Figure 1B:
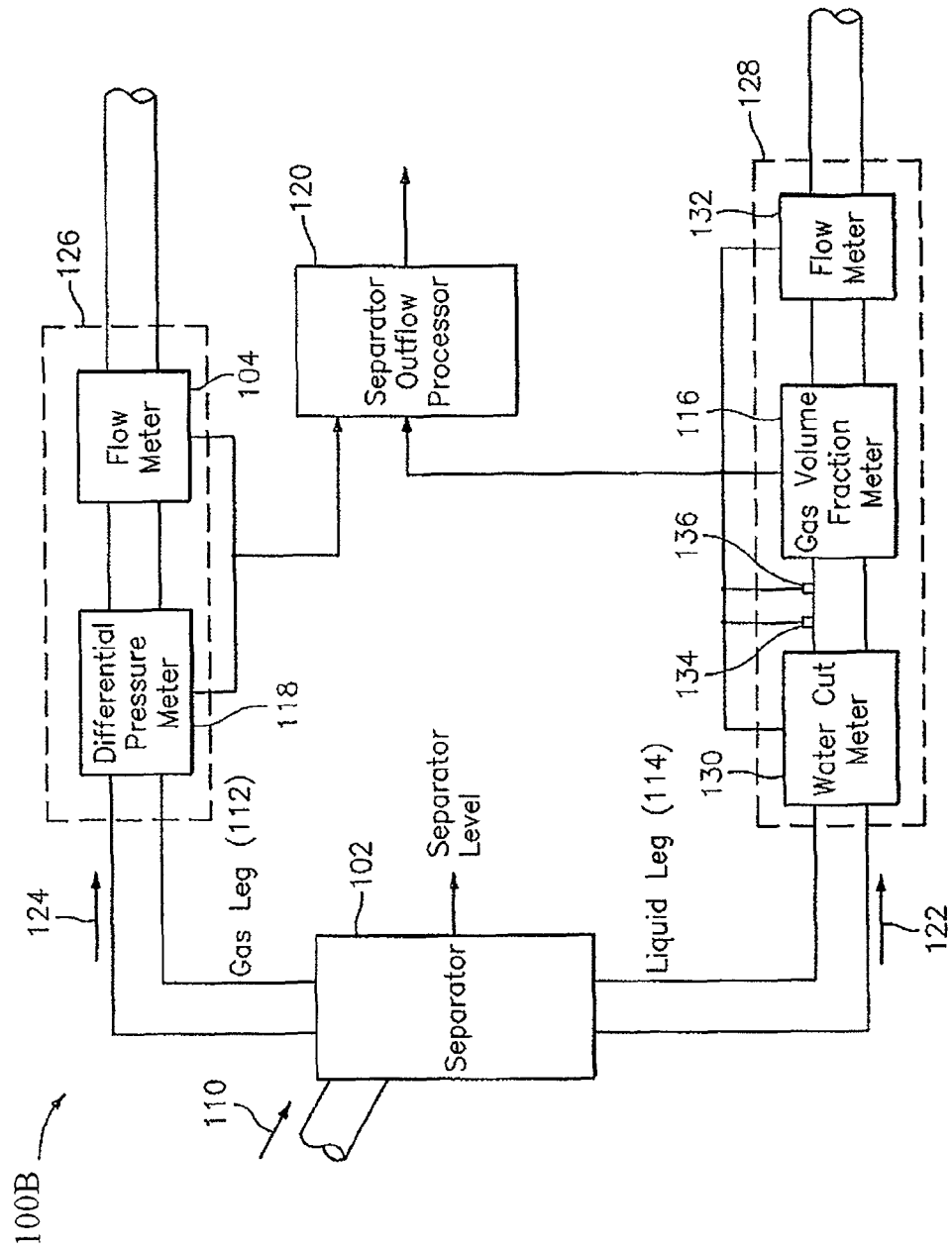
FIG. 1b is schematic diagram of a system for measuring the flow parameters of a multiphase fluid compensated for liquid carry-over and gas carry-under of a fluid separator having a gas leg and a liquid leg, embodying the present invention.
Figure 1C:
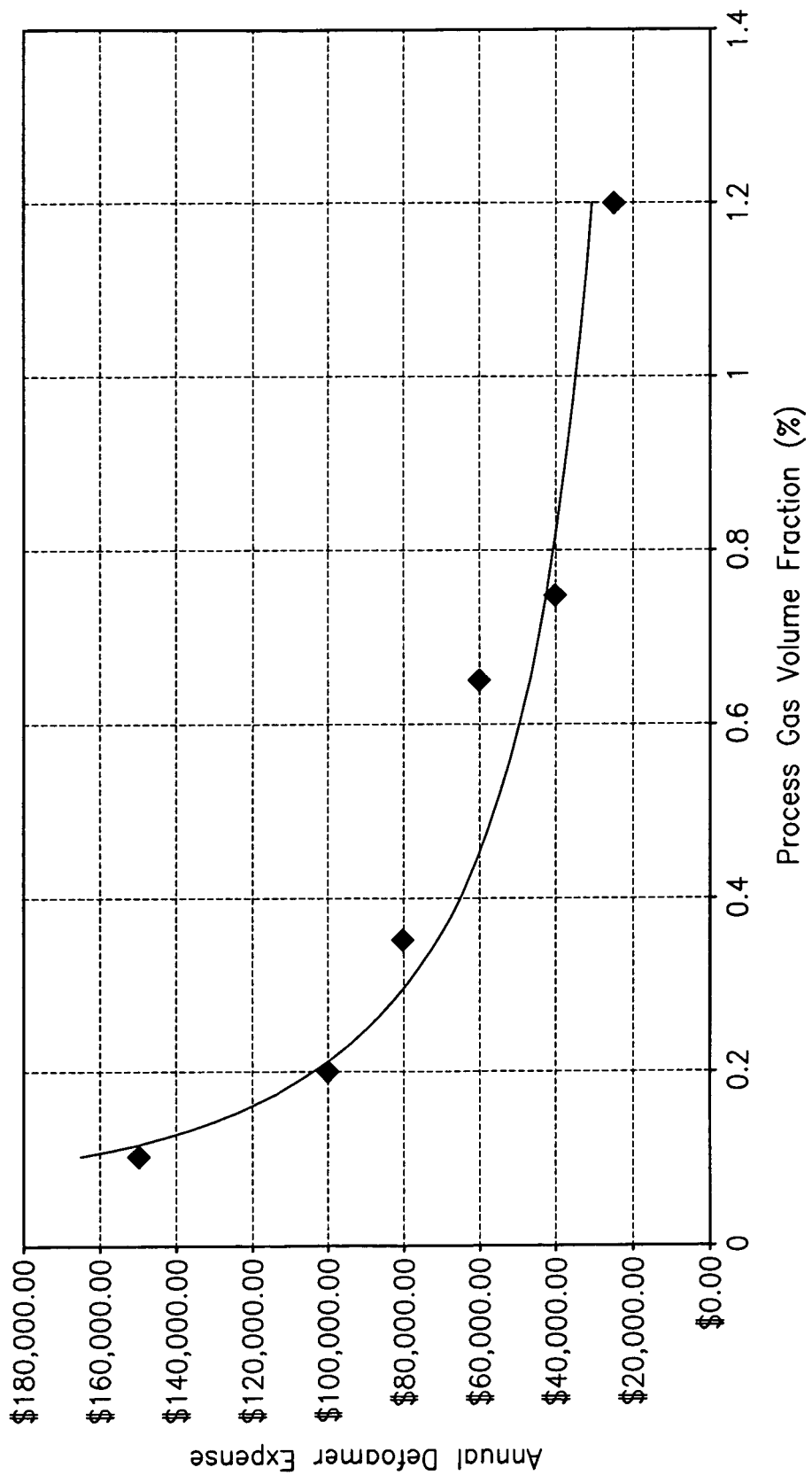
FIG. 1c is a plot indicative of the cost vs. Performance of defoamer usage in accordance with the present invention.

Referring to FIG. 1b, a system 100B for measuring the flow parameters of a multiphase fluid is shown that uses a gas/liquid separator 102 to separate the liquid portion and gas portion of the incoming fluid stream 110, which will be described in greater detail hereinafter. While the separator 102 separates the two phases of the fluid stream 110, there is carry over liquid in the gas leg 112 of the separator 102 and carry under gas in the liquid leg 114 of the separator 102. To reduce the gas carry under and liquid (mist) carry over, additives (e.g., defoamers and demistors, respectively) may be used to ensure adequate separation of produces gases and liquids. A gas volume fraction meter 116, such as the SONARtrac GVF-100 manufactured by CIDRA Corporation, may be used to measure the gas carry under in the liquid leg in real time, which will be described in greater detail hereinafter. In addition, a flow meter 104, such as the SONARtrac VF-100 manufactured by CiDRA Corporation, in combination with a DP meter 118 may be used to measure the liquid carry over in the gas leg 112 in real time. Both of the gas volume fraction meter 116 and the flow meter 104 may be clamp-on devices as described hereinafter. These monitoring device enable real time measurement of production separator performance. This real time measurement enables quantification of cost vs. performance of a given defoamer and/or demister. In other words, the monitoring devices enable a user to quantify the benefit associated with the chemical expense as shown in FIG. 1c.

It should be further appreciated that most defoamers and/or demistors are added to the fluid via an open loop control system, which may result in over-dosing. The present invention allows for the real time monitoring of defoamer and/or demistor performance and enables cost reduction through a close loop control. Specifically, the outputs of one of the monitoring systems in the liquid leg 114 and/or gas leg 112 of the separator 102 are communicated to a processor 120 which may then provide a control signal to a pump and/or valve that meters or provides the defoamer and/or demistor to the streaming fluid 110 or separated fluid 122, 124 in response to an input signal indicative of the desired amount of liquid (e.g., mist) in the gas leg 112 or desire amount of gas in the liquid leg 114. Furthermore, the flow and or separation process allows the user to quantify the chemical usage in each leg to optimize the usage of the respective chemicals in an open or a closed loop configuration.

It should be appreciated that the present invention allows for the better control and/or optimization of the process flow (i.e. more accurate measure of the GVF, liquid carry-over and/or gas carry-under) by controlling the at least one of the level of the separator, the actuation of the valves disposed in the flow process and/or the control of the defoamer/demister infusion. For example, if a situation arises where the liquid carry-over is high, an alarm may be communicated to an operator or a control processor, which then may raise the level of infusion of the demister chemical into the flow and/or lower the level of the separator. Another example may be if a situation arises where the gas carry-under is high, then an alarm may be communicated to an operator or a control processor, which then may raise the level of infusion of defoamer chemical into the flow and/or raise the level of the separator. Moreover, the valves (See FIG. 1a) may be selectively operated to provide better control over the flow process within each of the legs.

Figure 2:
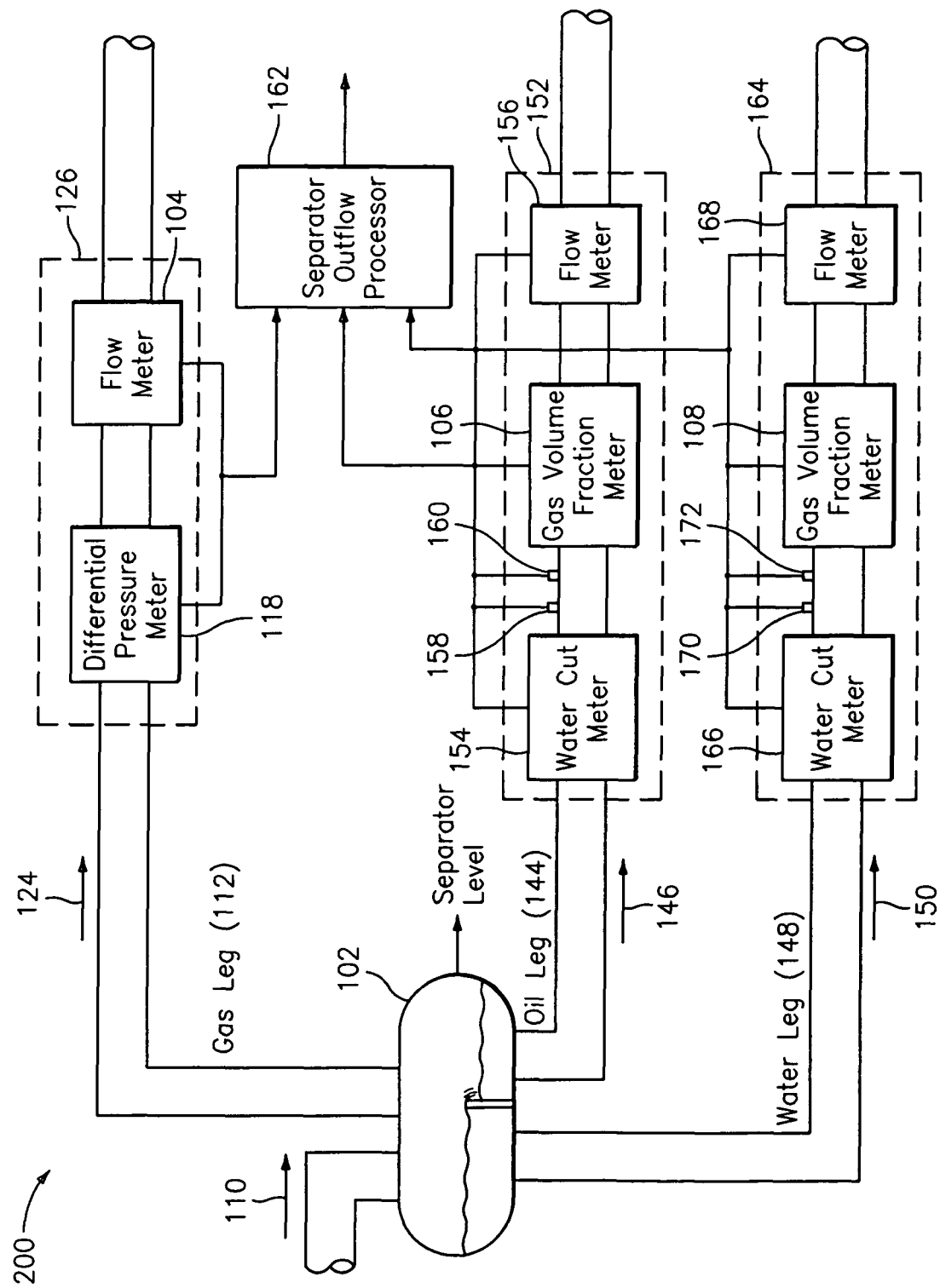
FIG. 2 is schematic diagram of a system for measuring the flow parameters of a multiphase fluid compensated for liquid carry-over and gas carry-under of a fluid separator having a gas leg, oil leg and a water leg, embodying the present invention.

Referring to FIG. 2, a system 200 is illustrated for measuring the flow parameters of a multiphase fluid. Referring to FIG. 1b and FIG. 2, a gas/liquid separator 102 is shown, wherein the gas/liquid separator 102 is an item of production equipment used to separate the liquid components 122 of an incoming fluid stream 110 from the gaseous components 124 of the incoming fluid stream 110. In the embodiment shown in FIG. 1b, the liquid component 122 and the gas component 124 flow from the separator 102 in separate pipes or 'legs' 112, 114 with the gas component 124 flowing in the gas leg 112 and the liquid component 122 flowing in the liquid leg 114. While the gas/liquid separator 102 is depicted as a vertical vessel, the gas/liquid separator 102 may be any device(s) for separating gas from one or more liquids suitable to the desired end purpose, such as that shown in FIG. 2. For example, the separator 102 may include a cylindrical or spherical vessel, and may be either horizontally or vertically positioned. Furthermore, the separator 102 may use gravity segregation, centrifugal separation, cyclone separation, or any other known means to accomplish the separation, and may include one or more stages.

Figure 3:
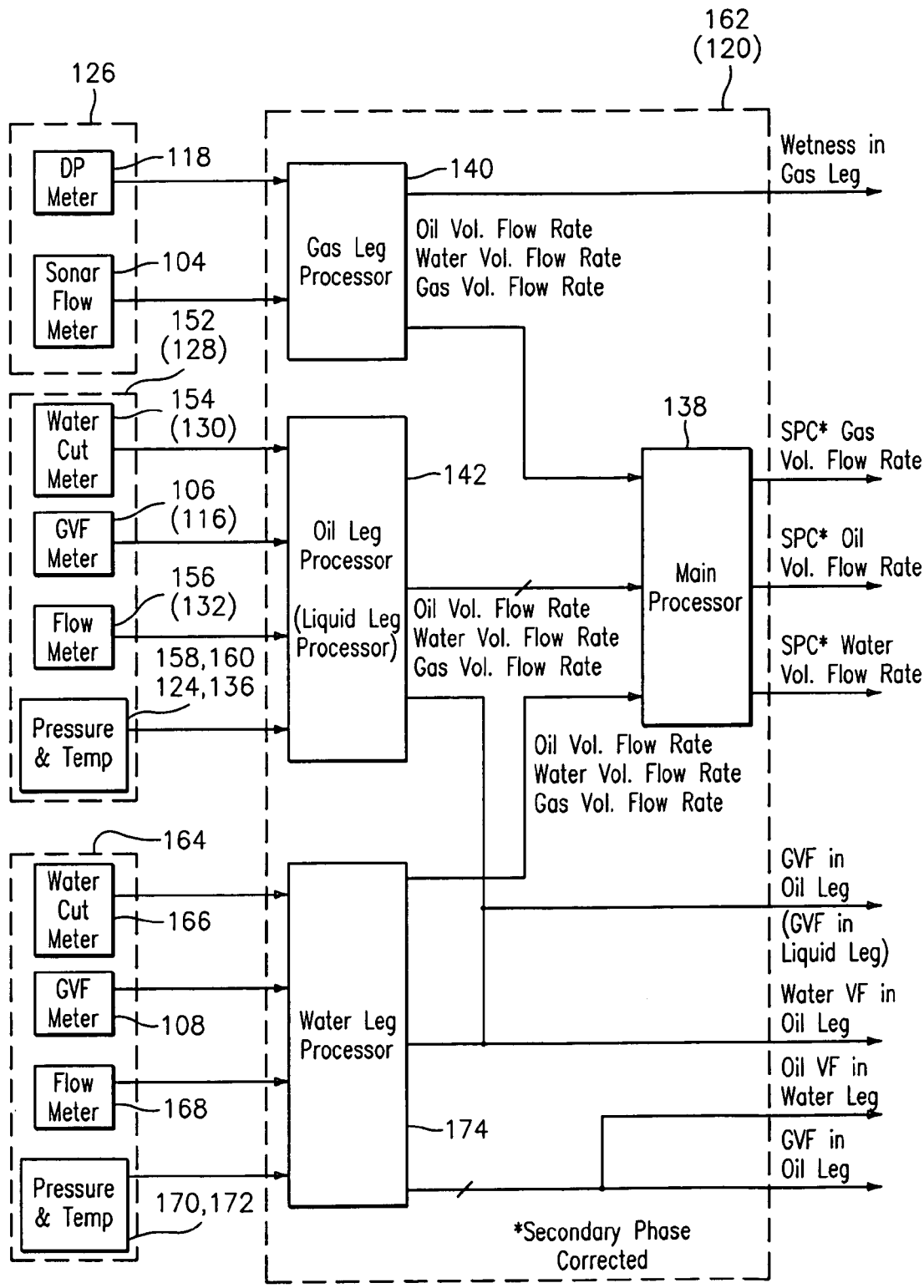
FIG. 3 is block diagram of a separator outflow processor of FIG. 2, embodying the present invention.

As discussed hereinbefore, the gas mixture 124 flowing in the gas leg 124 includes gas and liquid carry-over from the separator 102. An apparatus 126 may be provided to measure the wetness and flow rate of the gas mixture 124, wherein the apparatus 126 may include a differential flow meter ("DP meter") 118 and a sonar flow meter 104 having an array of strain-based sensors, similar to that described in U.S. patent application Ser. No. 11/482,871, which is incorporated herein in its entirety. The combination of the DP meter 118 and the sonar flow meter 104 provide flow rate measurements of the respective liquid and gas phases. As will be described in greater detail hereinafter, the separator outflow processor 120 determines the wetness of the gas mixture 124 in the gas leg 112, as shown in FIG. 3, as well as, the volumetric flow rate of the gas, and the volumetric flow rate of the liquid carry-over. The volumetric flow rate of the components of the liquid-carry over (i.e. oil and water) may be determined by assuming a known or typical water cut (or phase fraction) or by using the water cut measurement provided by the apparatus 128 disposed on the liquid leg 114 of the separator 102.

The apparatus 128 for measuring the liquid leg 114 having gas carry-under includes a water cut meter 130, a gas volume fraction meter 116, a flow meter 132, a pressure sensor 134, and a temperature sensor 136. While a pressure sensor 134 and a temperature sensor 136 are provided, it should be appreciated that one or both of these parameters may be simply estimated. It should be further appreciated that the water cut meter 130 provides a signal indicative of the percentage of water in the liquid mixture 122, the gas volume fraction meter 116 provides a signal (or pressure signals) indicative of the gas volume fraction of the liquid mixture 122 and the flow meter 132 provides a signal indicative of the velocity and/or volumetric flow rate of the liquid mixture 122. These signals are provided to the separator outflow processor 120 which determines gas volume fraction (GVF) of the liquid mixture 122, the volumetric flow rate of the oil in the liquid mixture 122, the volumetric flow of the water in the liquid mixture 122, and the volumetric flow of the gas in the liquid mixture 122.

Referring again to FIG. 3, a main processor 138 is provided and receives each of the determined volumetric flow rates of each phase from a gas leg processor 140 and a liquid leg processor 142, wherein the main processor 138 sums each respective volumetric flow rate for each phase to determine the total volumetric flow rate of each of the three phases (i.e., oil, water and gas) for the input mixture 110. Referring again to FIG. 2, the gas/liquid separator(s) 102 may include a gas leg 112 receiving a gas mixture 124 having oil and water carry-over, an oil leg 144 for receiving an oil mixture 146 having water and gas carry-under, and a water leg 148 for receiving a water mixture 150 having oil and gas carry-under. Similar to the system in FIG. 1b, the system in FIG. 2 may include an apparatus 126 disposed on the gas leg 112 for measuring the same parameters as discussed hereinbefore. Similarly, the system in FIG. 2 may include an apparatus 152 disposed on the oil leg 144 for measuring the volumetric flow of each phase (i.e., gas, water, and oil) of the oil mixture 146, as well as, the gas volume fraction of the gas carry-under and the water volume fraction of the water carry-under.

The apparatus 152 for measuring the oil leg 144 having gas carry-under and water carry-under may include a water cut meter 154, a gas volume fraction meter 106, a flow meter 156, a pressure sensor 158 and a temperature sensor 160. While a pressure sensor 158 and a temperature sensor 160 are provided, it should be appreciated that one or both of these parameters may simply be estimated. It should be further appreciated that the water cut meter 154 provides a signal indicative of the percentage of water in the oil mixture 146, the gas volume fraction meter 106 provides a signal (or pressure signals) indicative of the gas volume fraction of the oil mixture 146 and the flow meter 156 provides a signal indicative of the velocity and/or volumetric flow rate of the oil mixture 146. These signals are provided to a separator outflow processor 162 which determines gas volume fraction of the oil mixture 146, the water volume fraction of the oil mixture 146, the volumetric flow rate of the oil in the liquid mixture, the volumetric flow of the water in the liquid mixture, and the volumetric flow of the gas in liquid mixture.

The system in FIG. 2 may further include an apparatus 164 disposed on the water leg 148 for measuring the volumetric flow of each phase (i.e., gas, water, and oil) of the water mixture 150, as well as, the gas volume fraction of the gas carry-under and the oil volume fraction of the water carry-under. The apparatus 164 for measuring the water leg 148 having gas carry-under and oil carry-under may include a water cut meter 166, a gas volume fraction meter 108, a flow meter 168, a pressure sensor 170, and a temperature sensor 172. While a pressure sensor 170 and a temperature sensor 172 are provided, it should be appreciated that one or both of these parameters may simply be estimated. It should be further appreciated that the water cut meter 166 provides a signal indicative of the percentage of water in the water mixture 150, the gas volume fraction meter 108 provides a signal (or pressure signals) indicative of the gas volume fraction of the water mixture 150 and the flow meter 168 provides a signal indicative of the velocity and/or volumetric flow rate of the water mixture 150. These signals are provided to the separator outflow processor 162 which determines gas volume fraction of the water mixture 150, the oil volume fraction of the water mixture 150, the volumetric flow rate of the oil in the liquid mixture, the volumetric flow of the water in the liquid mixture, and the volumetric flow of the gas in liquid mixture.

Referring again to FIG. 3, the main processor 138 receives each of the determined volumetric flow rates of each phase from the gas leg processor 140, the oil leg processor 142 and the water leg processor 174 and sums each respective volumetric flow rate for each phase to determine the total volumetric flow rate of each of the three phases (i.e., oil, water and gas) for the input mixture 110. One should appreciate that the present invention provides significant information regarding the functioning, operation, and efficiency of the separator 102. For example, the systems of FIG. 1b and FIG. 2 provide information as to the amount of liquid carry-over in the gas leg, gas carry-under in the liquid leg, gas and oil carry-under in the water leg, and gas and water carry-under in the oil leg of the separator which are indicative of the operation of the separator 102. It is therefore contemplated in the present invention that these parameters and the other parameters measured by the present invention may be used to control particular parameters of the separator 102, such as the separator level, the feed rate to the separator 102 and the feed rate to the gas, liquid, oil and/or water legs. Moreover, the separator outflow processors 120, 162 may provide a control signal to a valve, pump or other actuator to control a parameter of the separator 102 to thereby provide a closed loop system. Additionally, the present invention also contemplates that the measurements provided may be used to diagnose problems, and/or failures with the separator 102 or may be used to provide a predictive analysis regarding the performance of the separator 102. It should be appreciated that the present invention contemplates providing an alarm to an operator and/or a control processor in the event a particular condition occurs. This would allow a rapid and target response to operational conditions.

Gas Leg Description

Figure 4:
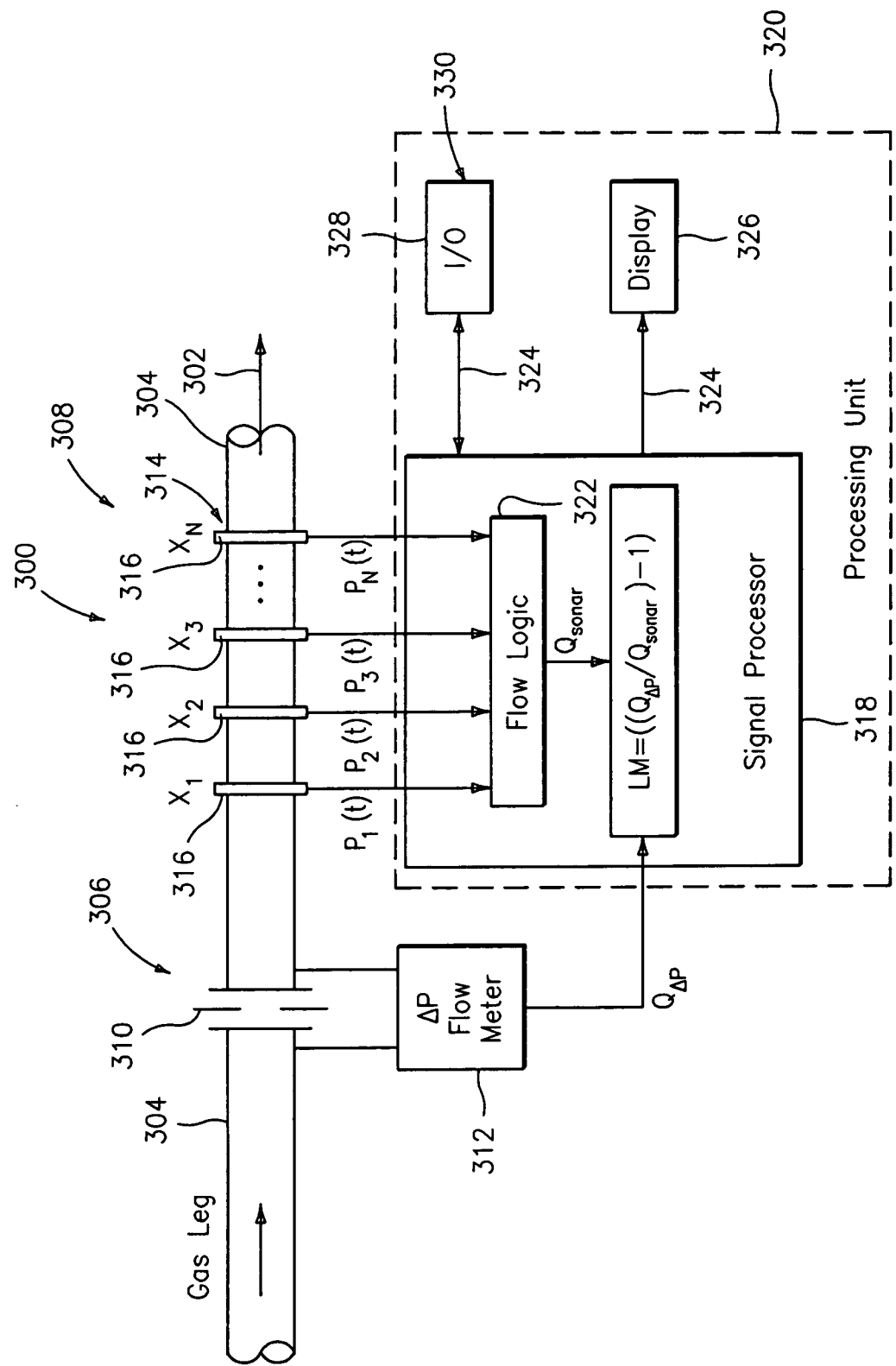
FIG. 4 is schematic diagram of an apparatus for measuring wetness and volumetric flow rate of a gas flow within a pipe of FIG. 1a, FIG. 1b and FIG. 2, embodying the present invention.

Referring to FIG. 4, an apparatus 300 for measuring wetness and volumetric flow rate of a gas flow 302 within a pipe 304 is shown and includes a differential pressure based flow meter 306 and a sonar flow meter 308, similar to that described in U.S. patent application Ser. No. 11/482,871, which is incorporated herein in its entirety. As will be described in further detail hereinafter, the volumetric flow rate of the gas flow 302 determined by the differential pressure based flow meter 306 ($Q_{\Delta P}$) is used along with the volumetric flow rate of the gas flow 302 determined by the sonar flow meter 308 ($Q_{sonar}$) to determine the wetness of the gas flow 302, which may be expressed as a Lockhardt Martinelli (LM) number. It should be appreciated that the errors in the interpreted liquid flow rate are generally correctable to a high degree of accuracy provided that the amount of entrained gas is known. Fortunately, from a measurement perspective, the source of the free gas in the liquid leg has no bearing in its effect on the flow measurement. However, the impact of the free gas scales directly with the gas void fraction.

In the example shown in FIG. 4, the pipe 304 is depicted as a gas leg 112 of a gas/liquid separator 102, as shown in FIG. 1b and FIG. 2. It is contemplated, however, that the apparatus 300 may be used on any duct, conduit or other form of pipe 304 through which a gas 302 flows. The differential pressure based flow meter 306 may include any type of flow meter that enables flow measurement using a differential pressure ($\Delta P$) in the flow 302. For example, the meter 306 may enable flow measurement by using a flow obstruction 310 to create a differential pressure that is proportional to the square of the velocity of the gas flow 302 in the pipe 304, in accordance with Bernoulli's theorem. This differential pressure ($\Delta P$) across the obstruction 310 is measured and converted into a flow rate using a secondary device 312, such as a differential pressure transmitter. In the example shown, the flow obstruction 310 is an orifice plate 310 through which the gas flow 302 passes. The transmitter 312 senses the drop in pressure of the flow 302 across the orifice plate 310, and determines a volumetric flow rate of the gas flow 302 ($Q_{\Delta P}$) as a function of the sensed pressure drop. While an orifice-based flow meter is shown, it will be appreciated that the differential pressure based flow meter 306 may include a venturi meter, an elbow flow meter, a v-cone meter or the like.

The sonar flow meter 308 includes a spatial array 314 of at least two pressure sensors 316 disposed at different axial locations $x_1 \ldots x_N$ along the pipe 304. Each of the pressure sensors 316 provides a pressure signal P(t) indicative of unsteady pressure within the pipe 304 at a corresponding axial location $x_1 \ldots x_N$ of the pipe 304. A signal processor 318 receives the pressure signals $P_1(t) \ldots P_N(t)$ from the pressure sensors 316 in the array 314, and determines the velocity and volumetric flow rate of the gas flow 302 using pressure signals from the pressure sensors 316. The signal processor 318 applies array-processing techniques to the pressure signals $P_1(t) \ldots P_N(t)$ to determine the velocity, volumetric flow rate, and/or other parameters of the gas flow 302.

While the sonar flow meter 308 is shown as including four pressure sensors 316, it is contemplated that the array 314 of pressure sensors 316 includes two or more pressure sensors 316, each providing a pressure signal P(t) indicative of unsteady pressure within the pipe 304 at a corresponding axial location X of the pipe 304. For example, the sonar flow meter 308 may include 2, 3, 4, 5, 6, 7, 8, 9, 10, 11, 12, 13, 14, 15, 16, 17, 18, 19, 20, 21, 22, 23, or 24 pressure sensors 316. Generally, the accuracy of the measurement improves as the number of sensors 316 in the array 314 increases. The degree of accuracy provided by the greater number of sensors 316 is offset by the increase in complexity and time for computing the desired output parameter of the flow. Therefore, the number of sensors 316 used is dependent at least on the degree of accuracy desired and the desire update rate of the output parameter provided by the meter 308.

The signals $P_1(t) \ldots P_N(t)$ provided by the pressure sensors 316 in the array 314 are processed by the signal processor 318, which may be part of a larger processing unit 320. For example, the signal processor 318 may be a microprocessor and the processing unit 320 may be a personal computer or other general purpose computer. It is contemplated that the signal processor 318 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

To determine the volumetric flow rate $Q_{sonar}$ of the gas flow 302, the signal processor 318 applies the data from the pressure sensors 316 to flow logic 322 executed by signal processor 318, wherein the flow logic 322 is described in further detail hereinafter. It is also contemplated that one or more of the functions performed by the secondary device 312 of the differential pressure flow meter 306 may be performed by the signal processor 318. For example, signals indicative of gas flow 302 pressure upstream and downstream of the orifice 310 may be provided to the signal processor 318, and the signal processor 318 may determine the volumetric flow rate $Q_{\Delta P}$. Using the volumetric flow rate of the gas flow 302 determined by the differential pressure based flow meter 306 ($Q_{\Delta P}$) and the volumetric flow rate of the gas flow 302 determined by the sonar flow meter 308 ($Q_{sonar}$), the signal processor 318 can determine the wetness of the flow 302.

Figure 5:
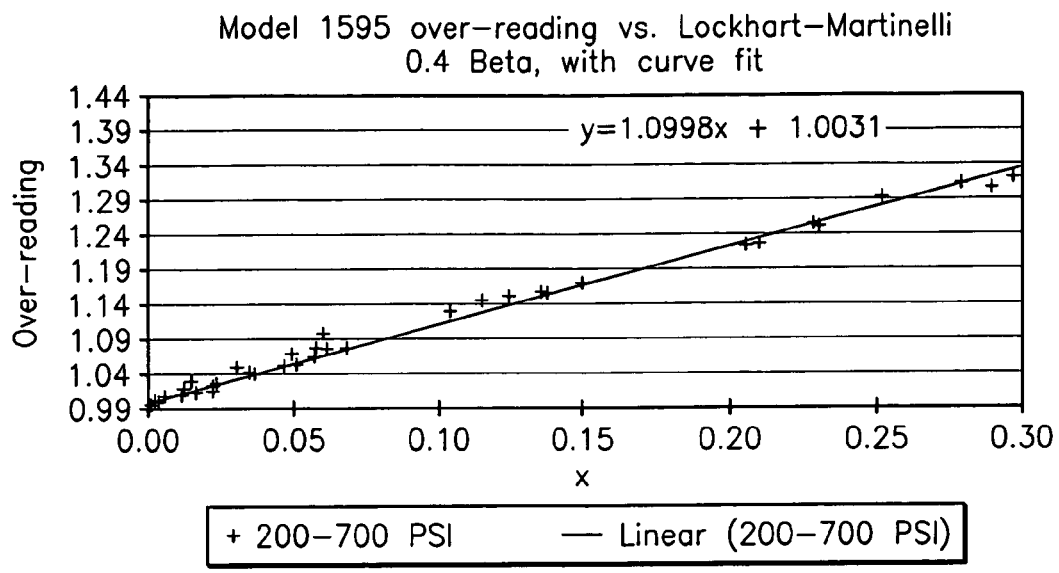
FIG. 5 is a plot of over reporting (over-reading) of an Emerson Model 1595 orifice based flow meter as a function of Lockhart-Martinelli number, embodying the present invention.

As previously noted, liquid carry-over in the gas leg 112 of the gas/liquid separator 102 can occur. One measure of the amount of liquid carry-over is the wetness of the flow 302, and one measure of the wetness of a gas continuous mixture is known as the Lockhardt Martinelli (LM) number, wherein the LM number is defined as the square root of the ratio of the product of liquid mass flow times liquid volumetric flow to the product of the gas mass flow times gas volumetric flow and may be expressed as, $$LM \equiv \sqrt{\frac{\dot{m}_{liq} Q_{liq}}{\dot{m}_{gas} Q_{gas}}} \equiv \sqrt{\frac{\rho_{liq} Q_{liq}^2}{\rho_{gas} Q_{gas}^2}} \equiv \left(\sqrt{\frac{\rho_{liq}}{\rho_{gas}}}\right)\left(\frac{Q_{liq}}{Q_{gas}}\right), \quad \text{(Eqn 2)}$$

wherein, $m_{liq}$ is the liquid mass flow, $Q_{liq}$ is the liquid volumetric flow, $\rho_{liq}$ is the density of the liquid, $m_{gas}$ is the gas mass flow, $Q_{gas}$ is the gas volumetric flow, and $\rho$gas is the density of the gas. The differential pressure based flow meter 306 will over report the volumetric flow rate of the gas flow 302 by a ratio of 1+LM compared to the volumetric flow reported for an equivalent volume flow rate of dry gas. FIG. 5 depicts a plot of over reporting (over-reading) of an Emerson Model 1595 orifice based flow meter as a function of the LM number. As shown, the over reporting scales linearly with the LM number.

Figure 6:
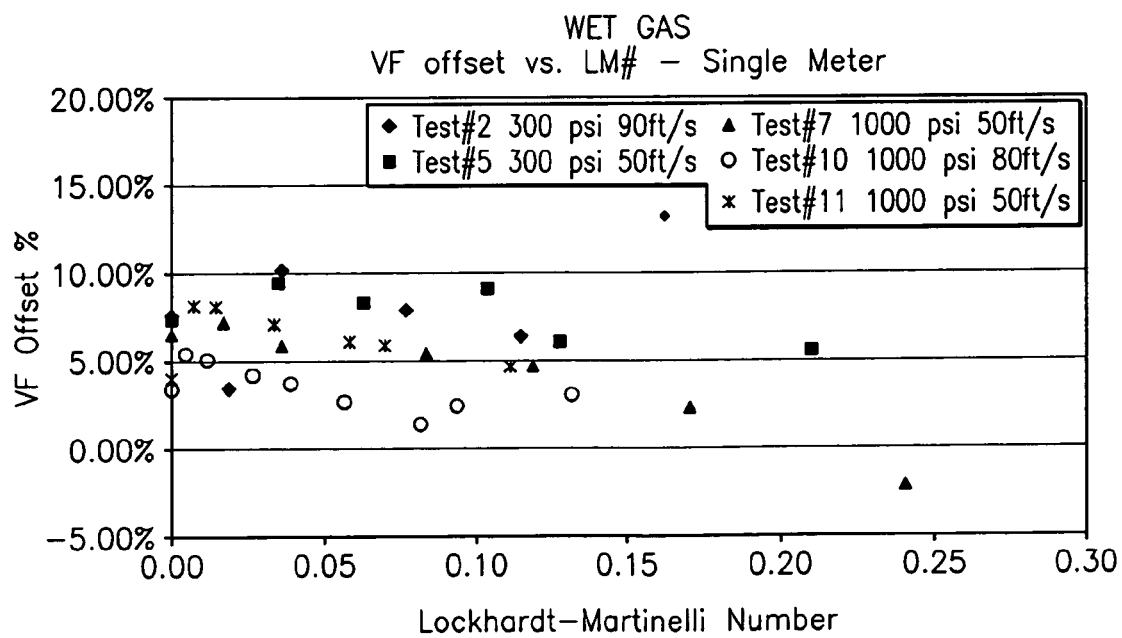
FIG. 6 is a plot depicting the offset between a sonar volumetric flow meter and a reference volumetric flow rate as a function of Lockhart-Martinelli number, embodying the present invention.

In contrast, the sonar volumetric flow meter 308 has been demonstrated to accurately report volumetric flows of wet gas with little sensitivity to the LM number (i.e. little sensitivity to wetness or carry-over). FIG. 6 depicts the offset between a sonar flow meter 308 and a reference volumetric flow rate as a function of the LM number. As shown, the offset is a relatively weak function of the LM number. Accordingly:

$$Q_{SONAR} = Q_{gas}, \quad \text{(Eqn. 3)}$$

where $Q_{SONAR}$ is the flow rate of the gas of the flow 302. Referring to FIG. 6, the two meters 306 and 308 will report the same flow rates for dry gases, and will report diverging flow rates with increasing wetness. Thus, the combination of the flow rates $Q_{\Delta P}$ and $Q_{sonar}$ from the differential pressure based flow meter 306 and the sonar flow meter 308 provides a measure of the both the flow rate and the wetness of a gas continuous flow 302, which can be determined by the signal processor 318 using the equations:

$$Q_{\Delta P} = Q_{gas}(1 + \alpha LM) \quad \text{(Eqn 4a)}$$

or $$LM = \frac{1}{\alpha}\left(\frac{Q_{\Delta P}}{Q_{SONAR}} - 1\right) \quad \text{(Eqn 4b)}$$

where α is an empirically determined wetness sensitivity coefficient that may be introduced by various factors, such as environmental factors (i.e. temperature and/or pressure) and/or factors related to the meter being used (i.e. a characteristic of an individual or group of meters and/or the tolerance of the meter). Moreover, It should be appreciated that a calibration point can be added by equating the outputs of the differential pressure based flow meter 306 and the sonar flow meter 308 during flow conditions where the gas is known to be dry.

As one can appreciate the LM may be determined using the measured volumetric flow rates (i.e., $Q_{\Delta P}$ and $Q_{SONAR}$) measured by the DP flow meter and the sonar flow meter, respectively, using Eqn 4b. Knowing the LM number and the density of the gas and liquid, the volumetric flow rate of the liquid may be determined using Eqn 2 and Eqn 3.

While the over-reporting may be defined as the linear function 1+αLM, one will appreciate that the invention contemplates that the over-reporting can be defined as any function suitable to the desired end purpose, such as a linear, quadratic, polynomial and/or logarithmic function that defines an over-reporting characteristics of the meters which will be described in greater detail hereinafter. In other words, any over-reporting function may be used that accurately fits the output of the flow meters over the desire range of LM numbers (e.g., curve fitting).

The signal processor 318 may output the LM number, the volumetric flow rates $Q_{\Delta P}$, $Q_{sonar}$, wetness of the gas mixture (phase fraction of liquid and gas, or liquid/gas ratio), volumetric flow rate of the liquid, and/or volumetric flow rate of the gas, or combinations thereof, and various other parameters that may be determined from these values as a signal 324. Assuming an oil/liquid cut or using an oil/liquid cut determined from the liquid legs, the volume and volumetric flow rate of the oil and the water may be determined. The signal 324 may be provided to a display 326 or another input/output (I/O) device 328, wherein the I/O device 328 may also accept user input parameters 330 as may be necessary or desired for the flow logic 322. The I/O device 328, display 326, and signal processor unit 318 may be mounted in a common housing, which may be attached to the array 314 by a flexible cable, wireless connection, or the like. The flexible cable may also be used to provide operating power from the processing unit 320 to the array 314 if necessary.

Figure 7A:
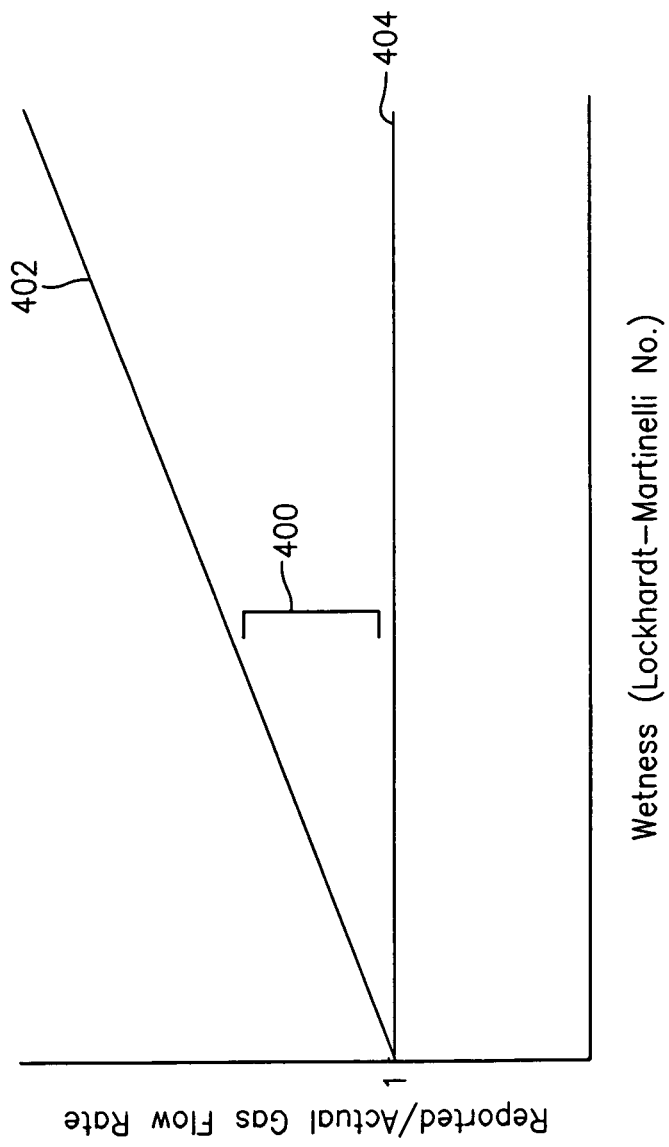
FIG. 7a is a plot depicting the wetness of the gas mixture as a function of the difference between the flow rate of a DP meter and a sonar meter, embodying the present invention.

It should be appreciated that the relationship of the LM number to the output of the DP flow meter ($Q_{\Delta P}$) and the sonar flow meter ($Q_{SONAR}$) as described hereinbefore is graphically illustrated in FIG. 7a. As shown, the difference 400 between the volumetric flow rate 402 of the DP flowmeter and the volumetric flow rate 404 of the sonar meter is related to the wetness of the gas flow, and is given by 1+αLM. While the description for the sonar meter provides an output signal representative of the velocity or flow rate of the gas to be used in the determination of the wetness, the invention contemplates that any other output of the sonar meter, which is insensitive to wetness may be used to determine the wetness of the gas.

It should be further appreciated that an output function of each of the flow meters may be provided that is dependent on a non-dimensional parameter relating to the wetness of the flow. For example, by utilizing the relationship between the volumetric flow rate or velocity of the flow obtained by the sonar flow meter, and the volumetric flow rate or velocity of the flow obtained by the DP flow meter (e.g., venturi meter), wherein the volumetric flow rate of the wet gas flow 104 obtained by the sonar flow meter, $Q_{SONAR}$, can be expressed as, $$Q_{SONAR} = (1+\alpha MR)Q_{gas}, \quad \text{(Eqn 5)}$$

and the volumetric flow rate of the flow obtained by the Venturi meter, $V_{venturi}$, can be expressed as, $$Q_{venturi} = (1+\beta MR+\chi MR^2)Q_{gas}, \quad \text{(Eqn 6)}$$

where $\alpha$, $\beta$ and $\chi$ are empirically determined wetness sensitivity coefficients, MR is the liquid to gas mass flow ratio and $Q_{gas}$ is the volumetric flow rate of the gas portion of the wet gas flow. While the over-reporting of the sonar meter may be defined as $1+\alpha MR$ and the over-reporting of the DP meter (e.g., venturi meter) may be defined as $1+\beta MR+\chi R^2$, one will appreciate that the invention contemplates that the over-reporting can be defined as any function suitable to the desired end purpose, such as a linear, quadratic, polynomial and/or logarithmic function that defines an over-reporting characteristics of the meters which will be described in greater detail hereinafter. Moreover, while $Q_{SONAR}$ is shown as being defined by the function in Eqn. 5 and $Q_{venturi}$ is shown as being defined by the function in Eqn. 6, it should be appreciated that $Q_{SONAR}$ and $Q_{venturi}$ may be defined by any function suitable to the desired end purpose, such as a linear, quadratic, polynomial and/or logarithmic function that defines an over-reporting characteristic of the meter(s) as will be described in greater detail hereinafter. In other words, any over-reporting function may be used that accurately fits the output of the flow meters over the desire range of MRs (e.g., curve fitting).

The value for MR may be determined by solving the above equations (Eqn. 5 and Eqn. 6) for $Q_{gas}$ and equating the two resultant equations as follows, $$Q_{gas} = \frac{Q_{SONAR}}{(1+\alpha MR)}, \quad \text{(Eqn 7)}$$

and $$Q_{gas} = \frac{Q_{venturi}}{(1+\beta MR+\chi MR^2)}. \quad \text{(Eqn 8)}$$

Thus, it follows that, $$\frac{Q_{SONAR}}{(1+\alpha MR)} = \frac{Q_{venturi}}{(1+\beta MR+\chi MR^2)}, \quad \text{(Eqn 9)}$$

and, therefore, $$MR = \frac{\left(-\left(\beta - \alpha \frac{Q_{venturi}}{Q_{sonar}}\right) + \sqrt{\left(\beta - \alpha \frac{Q_{venturi}}{Q_{sonar}}\right)^2 - 4\chi\left(1 - \frac{Q_{venturi}}{Q_{sonar}}\right)}\right)}{2\chi}. \quad \text{(Eqn 10)}$$

At this point, the gas flow rate, $Q_{gas}$, and the liquid flow rate, $Q_{Liq}$, can be determined by using the following relationships, $$Q_{gas} = \frac{Q_{SONAR}}{(1+\alpha MR)}, \quad \text{(Eqn 11)}$$

and $$Q_{liq} = \left(\frac{\rho_{gas}}{\rho_{liq}} MR\right) Q_{gas}, \quad \text{(Eqn 12)}$$

where $\rho_{gas}$ is the density of the gas flow and $\rho_{liq}$ is the density of the liquid flow.

Figure 7B:
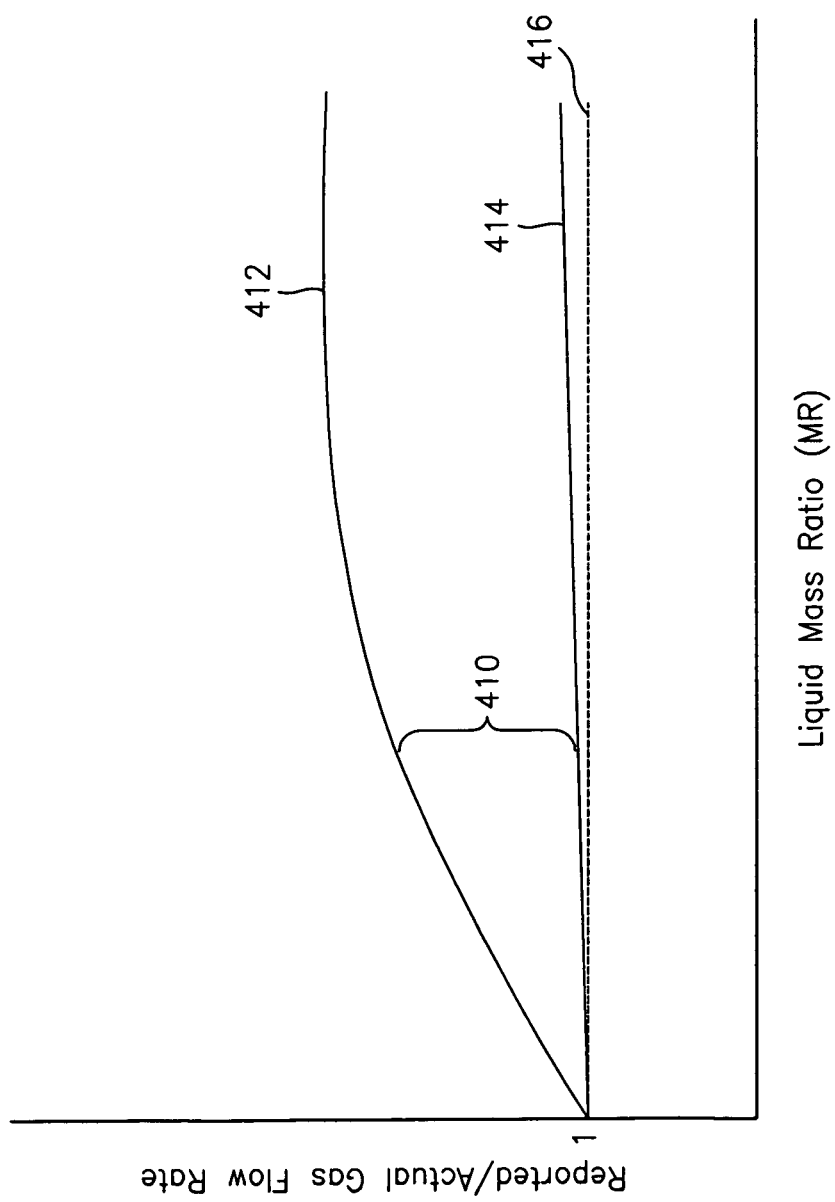
FIG. 7b is a plot depicting the wetness of the gas mixture as a function of the difference between the flow rate of a DP meter and a sonar meter, embodying the present invention.

It should be appreciated that the relationship of the MR to the output of the DP flowmeter ($Q_{\Delta P}$) and the sonar flow meter ($Q_{SONAR}$) as described hereinbefore is graphically illustrated in FIG. 7b. As shown, the difference 410 between the volumetric flow rate 412 of the DP flowmeter and the volumetric flow rate 414 of the sonar meter is relative to the wetness of the gas flow, and is given by the difference of $1+\beta MR+\chi MR^2$ and $1+\alpha MR$. While the description for the sonar flow meter provides an output signal representative of the velocity or volumetric flow rate of the gas to be used in the determination of the wetness, the invention contemplates that any other output of the sonar flow meter, which is insensitive to wetness may be used to determine the wetness of the gas. Additionally, while the DP flowmeter is described herein as being a venturi meter, the invention contemplates that any other type of DP flowmeter suitable to the desired end purpose may be used.

One will also appreciate that while the characteristics of the output was defined as the volumetric flow rates of the meters, the present invention contemplates that the characteristics may be define by any other output measured by the flow meters, such as the flow velocity, provided the sensitivity of the outputs to wetness are comparable to the sensitivity of the measured volumetric flow rate. In other words, the measured parameter of the DP flow meter is sensitive to wetness and the measured output of the sonar flow meter is relatively insensitive to wetness of the flow.

Furthermore, while the present invention defines the outputs of the DP flow meter and the sonar flow meter as a respective formula to be solved, it will be appreciated that the data may be provided in the form of a look-up table to provide a number for a non-dimensional parameter (e.g., LM number, MR), the volumetric liquid flow rate and volumetric gas flow rate of the flow in response to the measured parameters (velocity, volumetric flow) of the flow meters.

Liquid Leg Description

Figure 8:
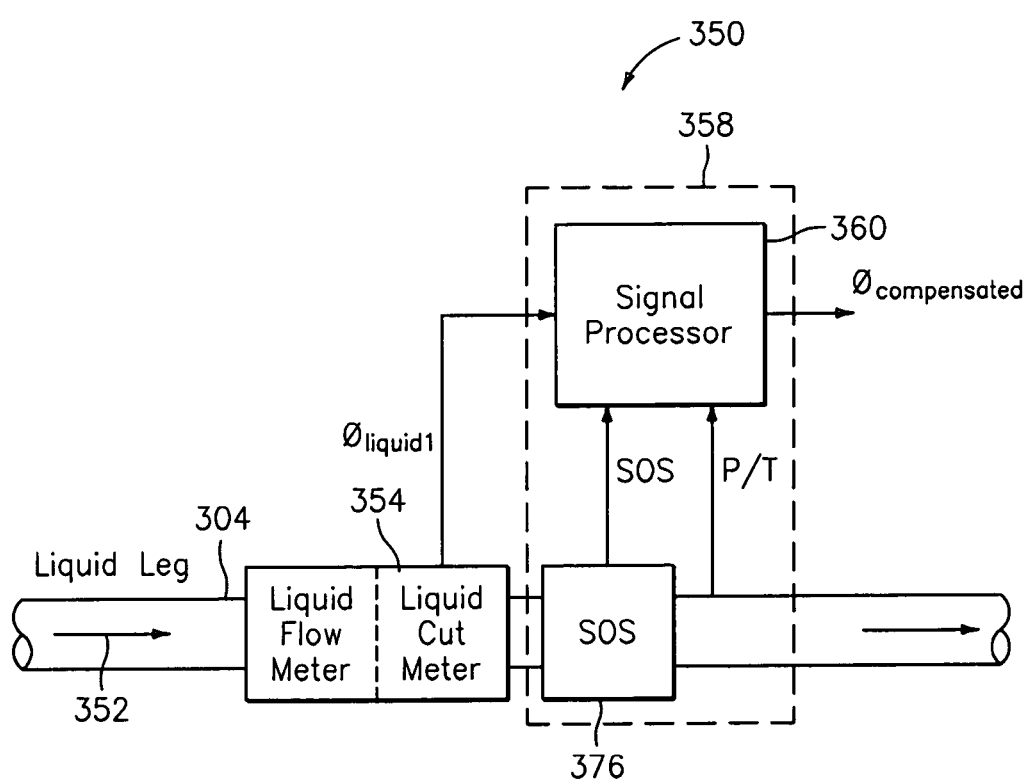
FIG. 8 is a schematic depiction of an apparatus for providing a fluid cut measurement of a multi-liquid mixture compensated for entrained gas, embodying the present invention.

Referring to FIG. 8, an apparatus 350 for providing a fluid cut measurement of a multi-liquid mixture 352 compensated for entrained gas is shown, wherein the apparatus 350 includes a fluid cut measurement device 354 configured to sense at least one parameter of the mixture 352 to determine a fluid cut of a liquid in the multi-liquid mixture 352 flowing in a pipe, duct, channel, conduit, or the like (hereinafter "pipe") 304. The apparatus 350 further includes a gas volume fraction (GVF) measurement device 358 configured to provide real-time measurement of entrained gas in the mixture 352 in response to a measured speed of sound in the mixture 352. The output from the fluid cut device 354 is provided to a signal processor 360, which is configured to adjust the measured fluid cut using the measured GVF to determine a compensated fluid cut of the liquid.

The fluid cut measurement device 354 (also known as a water cut measurement device) may be any typical fluid cut measurement device, such as a Coriolis meter, resonant microwave oscillator, and microwave absorption device. As will be described in further detail hereinafter, different types of fluid cut measurement devices employ different principles of operation, which are differently affected by entrained gas in the mixture. While each type of fluid cut device continues to provide a measurement in the presence of gas, the interpretation of their output can be significantly impacted without specific knowledge of the gas volume fraction. The errors in fluid cut introduced by unrecognized entrained gasses are discussed herein using first-principles relations developed for each type of fluid cut device, and different methods of correction are provided for each of the different types of fluid cut devices to account for the presence of free gas.

In the example shown in FIG. 1b and FIG. 2, the pipe 304 is depicted as a liquid leg of a gas/liquid separator 102. It is contemplated, however, that the apparatus 350 may be used on any duct, conduit or other form of pipe 304 through which a multi-liquid mixture 352 flows. Also, for simplification of discussion, the multi-liquid mixture 352 is described herein as a water/oil mixture, and various measurements are described as "water cut", "oil cut", and the like. It will be appreciated that the use of water and oil is for purposes of example only, and the apparatus 350 may be used for different multi-liquid mixtures, which may include suspended solids and other non-liquid materials.

The GVF device 358 may employ any technique that measures the sound speed of a fluid. However, it is particularly synergistic with meters such as described in U.S. patent application Ser. No. 10/007,736 filed Nov. 8, 2001, now U.S. Pat. No. 6,889,562, and U.S. patent application Ser. No. 09/729,994, filed Dec. 4, 200, now U.S. Pat. No. 6,609,069, which are incorporated herein by reference, in that the sound speed measurement, and thus gas volume fraction measurement, can be accomplished using the same hardware as that used for volumetric flow measurement. It should be noted, however, that the gas volume fraction measurement could be performed independently of a volumetric flow measurement, and would have utility as an important process measurement in isolation or in conjunction with other process measurements. U.S. Patent Application Publication No. 2004/0255695 published Dec. 23, 2004, U.S. Patent Application Publication No. 2005/0044929 published Mar. 3, 2005, and U.S. Patent Application Publication No. 2005/0061060 published Mar. 24, 2005, which are all incorporated by reference herein, also describe examples of such meters.

Figure 9:
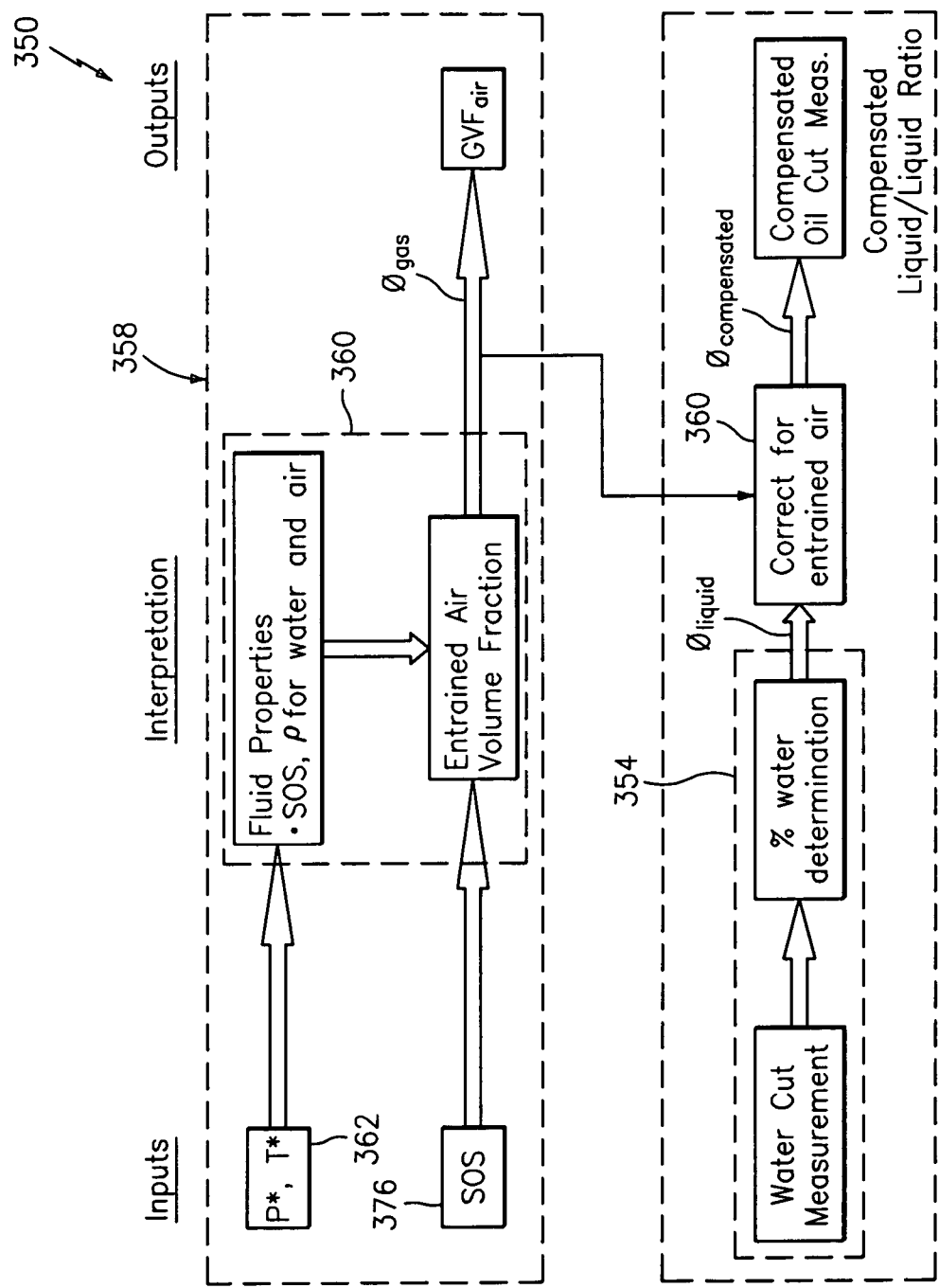
FIG. 9 is a functional flow diagram of a method for compensating the fluid cut measurement using an entrained gas measurement, embodying the present invention.

Referring to FIG. 9 a block diagram of the apparatus 350 of FIG. 8 that includes the device 358 for measuring the speed of sound propagating within the pipe 304, and the liquid cut measurement device 354 is shown. A pressure sensor and/or temperature sensor 362 measures the pressure and/or temperature of the mixture 352. Alternatively, the pressure and/or temperature may be estimated rather than actually measured. In response to the measured speed of sound, and the pressure and temperature, the signal processor 360 determines the GVF of the mixture 352, as will be described in further detail hereinafter. The fluid cut device 354 provides an output signal indicative of a fluid cut measurement (or a percent water determination) of the fluid flow. As used herein, "fluid cut" is the ratio of a fluid volume in the multi-fluid mixture 352 to total multi-fluid mixture 352 volume. In the signal output by the fluid cut device 354, the fluid cut may be expressed as a simple ratio, a percentage, the ratio of different fluids in the multi-fluid mixture 352, or any function of the ratio of the fluid volume in the mixture 352 to the total mixture 352 volume. The processor 360 processes the gas volume fraction measurement signal and the fluid cut measurement signal to provide a signal indicative of compensated fluid cut of the fluid flow. In the signal output by the fluid cut device 354, the compensated fluid cut may be expressed as a ratio of a fluid volume in the multi-fluid mixture 352 to total multi-fluid mixture 352 volume, a liquid/liquid ratio, or any function of the ratio of the fluid volume in the mixture 352 to the total mixture 352 volume. For example, the signal processor 360 may output a signal indicative of the net volumetric flow rate of one of the fluids in the multi-fluid mixture 352, as will be described in further detail hereinafter.

Figure 10:
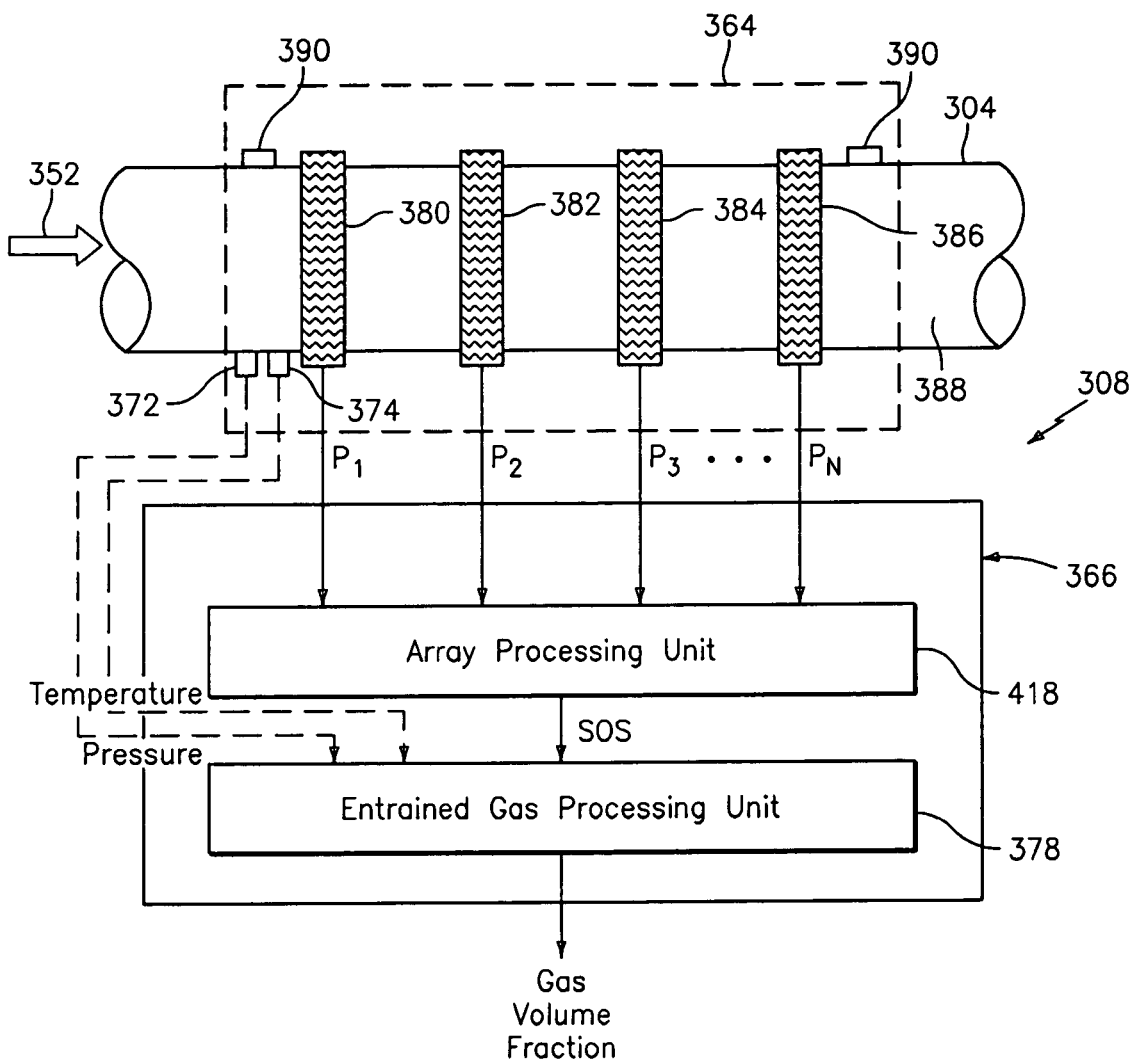
FIG. 10 is a schematic illustration of an apparatus having an array of sensors onto a pipe for measuring the volumetric flow and gas volume fraction of the mixture flowing in the pipe having entrained gas/air therein, embodying the present invention.
Figure 11:
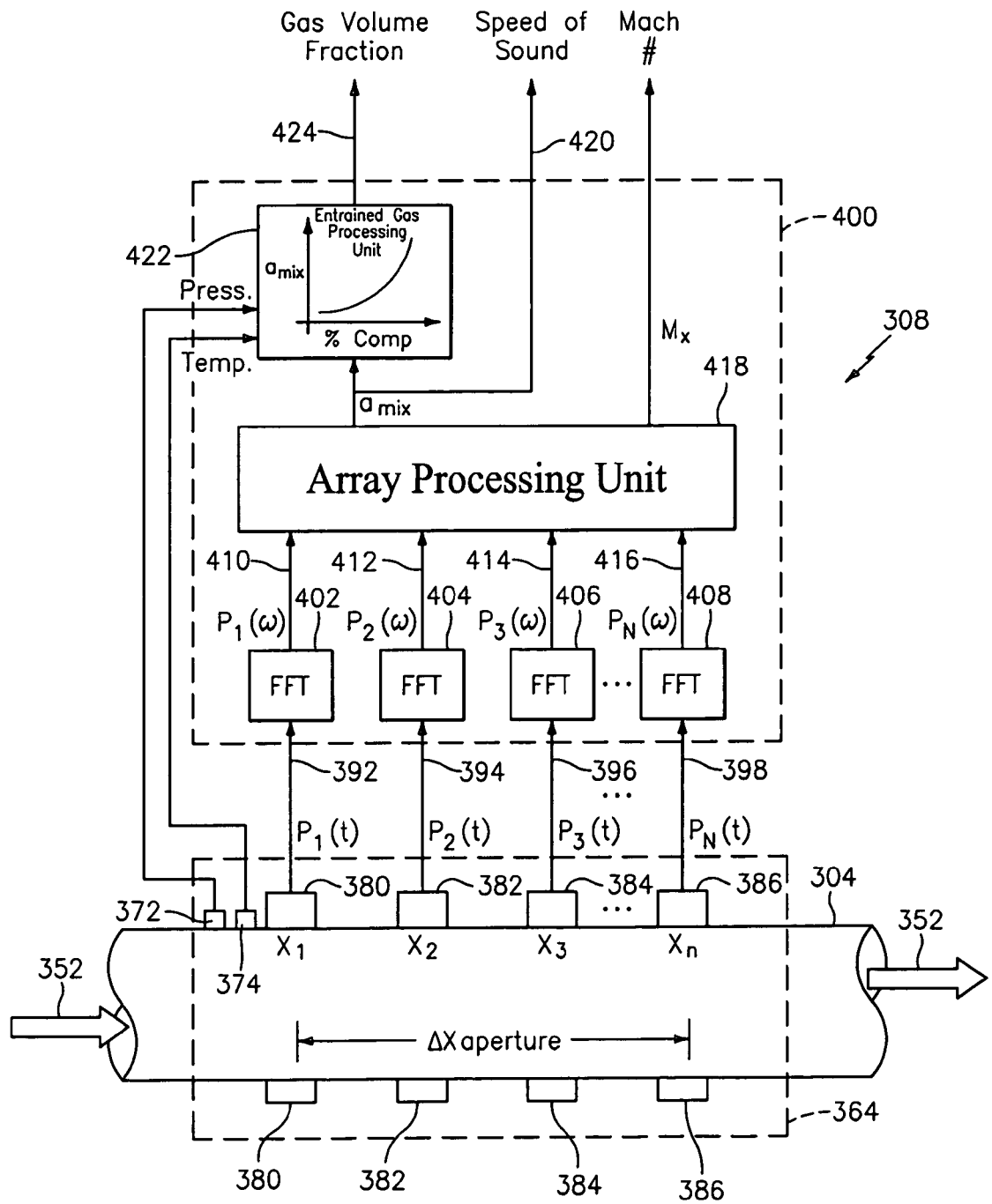
FIG. 11 is a block diagram of an apparatus for measuring the speed of sound propagating through a process flow flowing within a pipe, embodying the present invention.

FIG. 10 and FIG. 11 illustrate a gas volume fraction (GVF) meter, as may be used as device 308 of FIG. 1b and/or FIG. 4. The GVF meter 308 may include a sensing device 364 disposed on the pipe 304 and a processing unit 366 operably coupled to the sensing device 364. The sensing device 364 may comprise an array of at least two pressure sensors 380, 382 located in at least two locations $x_1$, $x_2$ axially along the pipe 304 for sensing respective stochastic signals propagating between the sensors 380,382 within the pipe 304 at their respective locations. Each sensor 380,382 provides a signal indicating an unsteady pressure at the location of the sensor 380,382 at each instant in a series of sampling instants. Referring to FIG. 10, an apparatus, generally shown as 308, is provided to measure gas volume fraction in liquids and mixtures (e.g. paper and pulp slurries or other solid liquid mixtures) having entrained gas therein (including air). The apparatus 308 in accordance with the present invention determines the speed at which sound propagates through the fluid 352 within a pipe 14 to measure entrained gas in liquids and/or mixtures 352. To simplify the explanation of the present invention, the flow 352 propagating through the pipe 304 will be referred to as a mixture or slurry with the understanding that the flow may be a liquid or any other mixture having entrained gas therein.

The following approach may be used with any technique that measures the sound speed of a flow or speed at which sound propagates through the flow 352. However, it is particularly synergistic with flow meters using sonar-based array processing, such as described in U.S. Pat. No. 6,889,562 and U.S. Pat. No. 6,609,069, which are incorporated herein by reference. While the sonar-based flow meter using an array of sensors to measure the speed of sound of an acoustic wave propagating through the mixture is shown and described, one will appreciate that any means for measuring the speed of sound of the acoustic wave may used to determine the entrained gas volume fraction of the mixture/fluid.

Referring to FIG. 11, a block diagram of the apparatus 308 of FIG. 10 is shown, wherein the apparatus 308 includes a device for measuring the speed of sound (SOS) propagating through the flow 352 within a pipe 304. A pressure sensor and/or temperature sensor 372, 374 measure the pressure and/or temperature, respectively, of the mixture 352 flowing through the pipe 304. In response to the speed of sound signal 376 and the characteristics 362 of the flow (e.g., pressure and temperature), an entrained gas processing unit 378 determines the gas volume fraction (GVF) of the flow 352. The pressure and temperature sensors enable the apparatus 308 to compensate or determine the gas volume fraction for dynamic changes in the pressure and temperature of the flow 352. Alternatively, the pressure and/or temperature may be estimated rather than actually measured.

A flow chart shown in FIG. 9 illustrates the function of the entrained gas processing unit 378. As shown in FIG. 10, the inputs to the processing unit 378 include the speed of sound (SOS) 376 within the mixture 352 in the pipe 304, and the pressure and/or temperature of the mixture 352. The fluid properties of the mixture 352 (e.g., SOS and density) are determined knowing the pressure and temperature of the mixture 352. The gas volume fraction of the mixture (GVF) is determined using the SOS measurement and fluid properties, which will be described in greater detail hereinafter. FIG. 10 illustrates a schematic drawing of one embodiment of the present invention. The apparatus 308 includes a sensing device 364 comprising an array of pressure sensors (or transducers) 380-386 spaced axially along the outer surface 388 of a pipe 304, having a process flow propagating therein. The pressure sensors 380-386 measure the unsteady pressures produced by acoustical disturbances within the pipe 304, which are indicative of the SOS propagating through the mixture 352. The output signals ($P_1$-$P_N$) of the pressure sensors 380-386 are provided to the processor 366, which processes the pressure measurement data and determines the speed of sound and gas volume fraction (GVF).

In an embodiment of the present invention shown in FIG. 10, the apparatus 308 has at least four pressure sensors 380-386 disposed axially along the pipe 304 for measuring the unsteady pressure $P_1$-$P_N$ of the mixture 352 flowing therethrough. The speed of sound propagating through the flow 352 is derived by interpreting the unsteady pressure field within the process piping 304 using multiple transducers displaced axially over ~2 diameters in length. The flow measurements can be performed using ported pressure transducers or clamp-on, strain-based sensors. The apparatus 308 has the ability to measure the gas volume fraction by determining the speed of sound of acoustical disturbances or sound waves propagating through the flow 352 using the array of pressure sensors 380-386. While the apparatus of FIG. 10 shows at least four pressure sensors 380-386, the present invention contemplates an apparatus having an array of two or more pressure sensors and having as many as sixteen (16) pressure sensors.

Generally, the apparatus 308 measures unsteady pressures created by acoustical disturbances propagating through the flow 352 to determine the speed of sound (SOS) propagating through the flow 352. Knowing the pressure and/or temperature of the flow and the speed of sound of the acoustical disturbances, the processing unit 366 can determine the gas volume fraction of the mixture. The apparatus in FIG. 10 also contemplates providing one or more acoustic sources 390 to enable the measurement of the speed of sound propagating through the flow for instances of acoustically quiet flow. The acoustic source 390 may be a device the taps or vibrates on the wall of the pipe 304, for example. The acoustic sources 390 may be disposed at the input end of output end of the array of sensors 380-386, or at both ends as shown. One should appreciate that in most instances the acoustics sources are not necessary and the apparatus passively detects the acoustic ridge provided in the flow 352. The passive noise includes noise generated by pumps, valves, motors, and the turbulent mixture itself.

The apparatus 308 of the present invention may be configured and programmed to measure and process the detected unsteady pressures $P_1$(t)-$P_N$(t) created by acoustic waves propagating through the mixture to determine the SOS through the flow 352 in the pipe 304. One such apparatus is shown in FIG. 4 that measures the speed of sound (SOS) of one-dimensional sound waves propagating through the mixture to determine the gas volume fraction of the mixture. It is known that sound propagates through various mediums at various speeds in such fields as SONAR and RADAR fields.

The speed of sound propagating through the pipe 304 and mixture 352 may be determined using a number of known techniques, such as those set forth in U.S. patent application Ser. No. 09/344,094, entitled "Fluid Parameter Measurement in Pipes Using Acoustic Pressures", filed Jun. 25, 1999, now U.S. Pat. No. 6,354,147; U.S. patent application Ser. No. 09/729,994, filed Dec. 4, 2002, now U.S. Pat. No. 6,609,069; U.S. patent application Ser. No. 09/997,221, filed Nov. 28, 2001, now U.S. Pat. No. 6,587,798; and U.S. patent application Ser. No. 10/007,749, entitled "Fluid Parameter Measurement in Pipes Using Acoustic Pressures", filed Nov. 7, 2001, each of which are incorporated herein by reference.

In accordance with one embodiment of the present invention, the speed of sound propagating through the mixture 352 is measured by passively listening to the flow with an array of unsteady pressure sensors to determine the speed at which one-dimensional compression waves propagate through the mixture 352 contained within the pipe 304. As shown in FIG. 11, an apparatus 308 embodying the present invention has an array of at least three acoustic pressure sensors 380,382,384, located at three locations $x_1$, $x_2$, $x_3$ axially along the pipe 304. One will appreciate that the sensor array may include more than three pressure sensors as depicted by pressure sensor 386 at location $x_N$. The pressure generated by the acoustic waves may be measured through pressure sensors 380-386. The pressure sensors 380-386 provide pressure time-varying signals $P_1$(t),$P_2$(t),$P_3$(t),$P_N$(t) on lines 392,394,396,398 to a signal processing unit 400 to known Fast Fourier Transform (FFT) logics 402,404,406,408, respectively. The FFT logics 402-408 calculate the Fourier transform of the time-based input signals $P_1$(t)-$P_N$(t) and provide complex frequency domain (or frequency based) signals $P_1$(ω),$P_2$(ω),$P_3$(ω), $P_N$(ω) on lines 410,412,414,416 indicative of the frequency content of the input signals. Instead of FFT's, any other technique for obtaining the frequency domain characteristics of the signals $P_1$(t)-$P_N$(t), may be used. For example, the cross-spectral density and the power spectral density may be used to form a frequency domain transfer functions (or frequency response or ratios) discussed hereinafter.

The frequency signals $P_1$(ω)-$P_N$(ω) are fed to an array processing unit 418 which provides a signal to line 420 indicative of the speed of sound of the mixture $a_{mix}$, discussed more hereinafter. The $a_{mix}$ signal is provided to an entrained gas processing unit 422, similar to the processing unit 378, which converts $a_{mix}$ to a percent composition of a mixture and provides a gas volume fraction or % Comp signal to line 424 indicative thereof (as discussed hereinafter). The data from the array of sensors 380-386 may be processed in any domain, including the frequency/spatial domain, the temporal/spatial domain, the temporal/wave-number domain or the wave-number/frequency (k-ω) domain. As such, any known array processing technique in any of these or other related domains may be used if desired, similar to the techniques used in the fields of SONAR and RADAR.

One such technique of determining the speed of sound propagating through the flow 352 is using array processing techniques to define an acoustic ridge in the k-w plane. The slope of the acoustic ridge is indicative of the speed of sound propagating through the flow 352, which will be described in greater detail hereinafter. This technique is similar to that described in U.S. Pat. No. 6,587,798 filed Nov. 28, 2001, titled "Method and System for Determining The Speed of Sound in a Fluid Within a Conduit", which is incorporated herein by reference. The speed of sound (SOS) is determined by applying sonar arraying processing techniques to determine the speed at which the one dimensional acoustic waves propagate past the axial array of unsteady pressure measurements distributed along the pipe 304. The signal processor performs a Fast Fourier Transform (FFT) of the time-based pressure signals $P_1(t)$-$P_N(t)$ to convert the pressure signal into the frequency domain. The power of the frequency-domain pressure signals are then determined and defined in the k-ω plane by using array processing algorithms (such as Capon and Music algorithms). The acoustic ridge in the k-ω plane, as shown in the k-ω plot of FIG. 25, is then determined. The speed of sound (SOS) is determined by measuring slope of the acoustic ridge. The gas volume fraction is then calculated or otherwise determined, as described hereinafter.

It should be appreciated that the flow meter of the present invention uses known array processing techniques, in particular the Minimum Variance, Distortionless Response (MVDR, or Capon technique), to identify pressure fluctuations, which convect with the materials flowing in a conduit and accurately ascertain the velocity, and thus the flow rate, of said material. These processing techniques utilize the covariance between multiple sensors at a plurality of frequencies to identify signals that behave according to a given assumed model, for example, in the case of the apparatus 308, a model, which represents pressure variations convecting at a constant speed across the pressure sensors comprising the flow meter monitoring head. To calculate the power in the k-ω plane, as represent by a k-ω plot of either the pressure signals, the processor determines the wavelength and so the (spatial) wavenumber k, and also the (temporal) frequency and so the angular frequency ω, of various spectral components of the acoustic waves created passively or actively within the pipe. There are numerous algorithms available in the public domain to perform the spatial/temporal decomposition of arrays of sensor units.

The sensor array may include more than two pressure sensors as depicted by pressure sensor 384,386 at locations $x_3$, $x_N$, respectively. The array of sensors of the sensing device 364 may include any number of pressure sensors 380-386 greater than two sensors, such as three, four, eight, sixteen or N number of sensors between two and twenty-four sensors. Generally, the accuracy of the measurement improves as the number of sensors in the array increases. The degree of accuracy provided by the greater number of sensors is offset by the increase in complexity and time for computing the desired output parameter of the mixture. Therefore, the number of sensors used is dependent at least on the degree of accuracy desired and the desired update rate of the output parameter provided by the apparatus. The pressure sensors 380-386 may be clamped onto or generally removably mounted to the pipe by any releasable fastener, such as bolts, screws and clamps. Alternatively, the sensors may be permanently attached to, ported in or integral (e.g., embedded) with the pipe 304. The device may include one or more acoustic sources 390 to enable the measurement of the speed of sound propagating through the mixture 352 for instances of acoustically quiet flow. The acoustic source may be a device the taps or vibrates on the wall of the pipe, for example. The acoustic sources may be disposed at the input end of output end of the array of sensors 380-386, or at both ends as shown. One should appreciate that in most instances the acoustics sources are not necessary and the apparatus passively detects the acoustic ridge provided in the flow 352, as will be described in greater detail hereinafter. The passive noise includes noise generated by pumps, valves, motors, and the turbulent mixture itself.

The pressure generated by the acoustic pressure disturbances is measured through the pressure sensors 380-386, which provide analog pressure time-varying signals $P_1(t)$,$P_2(t)$,$P_3(t)$,$P_N(t)$ to the signal processing unit 360. The processing unit 360 processes the pressure signals to first provide output signals indicative of the speed of sound propagating through the flow 352, and subsequently, provide a GVF measurement in response to pressure disturbances generated by acoustic waves propagating through the flow 352, which will be described in greater detail hereinafter. Referring again to FIG. 1b, the gas/liquid separator 102 is an item of production equipment used to separate liquid components of an incoming fluid stream 110 from gaseous components. The liquid and gas components flow from the separator 102 in separate pipes (legs) 112 and 114, with the leg 114 containing the liquid component and the leg 112 containing the gas component. The gas leg 112 may include a gas flow meter 104, which measures the volumetric flow rate of a gas flowing therethrough. Similarly, the fluid leg 114 may include a fluid flow meter 128 that measures the volumetric flow rate of the mixture 122 flowing through the fluid leg 114. It should be appreciated that the fluid flow meter 128 may be separate from the fluid cut device 130 and the GVF device 116, as is the case where turbine type flow meters are used, or the fluid flow meter 132 may be combined with the fluid cut device 130, as is the case where a Coriolis meter is used, or with the GVF device 116, which may be configured to provide flow measurement as described above.

While the separator 102 is depicted as a vertical vessel, the gas/liquid separator 102 may be any device for separating gas from a multi-fluid mixture. For example, the separator 102 may include a cylindrical or spherical vessel, and may be either horizontally or vertically positioned. Furthermore, the separator 102 may use gravity segregation, centrifugal separation, cyclone separation, or any other known means to accomplish the separation, and may include one or more stages operating in continuous or batch modes. In multiphase measurement approaches that utilize gas/liquid separators, net oil volumetric flow rate, $Q_{NO}$, is determined by the product of net volumetric flow, Q, which is determined by the fluid flow meter and the oil phase fraction of the liquid leg of the separator, $\phi_O$, and may be given by, $$Q_{NO} = Q \cdot \phi_O.  \quad \text{(Eqn. 5)}$$

The oil phase fraction is determined using fluid cut device. Under the assumption that no gas is present, knowledge of water cut uniquely determines oil cut, and may be given by, $$\phi_O + \phi_W = 1 \quad \text{(Eqn. 6)}$$

With gas present, the water fraction, oil fraction, and gas volume fraction sum to unity and the direct, one-to-one relationship between water cut and oil cut is lost, and may be given by, $$\phi_O + \phi_W + \phi_G = 1 \quad \text{(Eqn. 7)}$$

In the presence of free gas, net oil production is given by the product of oil fraction of the total mixture of oil, water, and gas times the total volumetric flow rate of the mixture. As previously noted, different types of fluid cut measurement devices employ different principles of operation, which are differently affected by entrained gas in the mixture. While each type of fluid cut device continues to provide a measurement in the presence of gas, the interpretation of their output can be significantly impacted without specific knowledge of the gas volume fraction. The errors in fluid cut introduced by unrecognized entrained gasses, and different methods of correcting these errors, will now be discussed for three different fluid cut devices: density based fluid cut devices, resonant microwave oscillators, and microwave absorption devices.

Density Based Fluid Cut Devices

Density based fluid cut devices, such as Coriolis meters, are widely used in net oil measurement and since these meters provide both mass flow and density, they are well-suited for net oil measurements. Although the performance of Coriolis meters in the presence of entrained gases is, in general, dependent on its design parameters, it is assumed that the Coriolis meters considered herein provide accurate mixture mass flow and density for the liquid and slightly aerated liquids. The present embodiment is particularly useful for use with U-tube Coriolis meters, which have been demonstrated to accurately report mass flow and density on aerated mixtures. However, it will be appreciated that the present embodiment may be used with straight tube Coriolis meters and other types of density based fluid cut devices.

Using a Coriolis meter, net oil rate is determined by first calculating the gross volumetric rate from the ratio of measured mass flow rate and measured density. In the absence of free gas, the oil cut of oil/water mixtures is related to the mixture density through knowledge of the single component oil and water densities, as given by, $$\phi_O^* = \frac{\rho_W - \rho_{mixture}}{\rho_W - \rho_O}. \quad \text{(Eqn. 8)}$$

Here the asterisk is used to define oil cut and water cut inferred from measurements assuming no gas is present. The water cut is related to the oil cut through the assumption that the two components occupy the pipe:

$$\phi_W^* = 1 - \phi_O^* = \frac{\rho_{mixture} - \rho_W}{\rho_W - \rho_O}. \quad \text{(Eqn. 9)}$$

The effect of free gas on density-based, oil-cut determination can be assessed by expanding the interpretation of density to include a three-component mixture of oil, water, and gas. The density of an N-component mixture is given by a volumetrically-weighted average of the individual component densities. For oil, water and gas mixtures, mixture density is thus given by:

$$\rho_{mixture} = \phi_O \rho_O + \phi_W \rho_W + \phi_G \rho_G \quad \text{(Eqn. 10)}$$

with $$\phi_O + \phi_W + \phi_G = 1 \quad \text{(Eqn. 11)}$$

where O, W and G subscripts refer to oil, water and gas, respectively.

Using these definitions, the oil fraction can be shown to be a function of the measured mixture density, the pure component oil and water densities, as well as the gas volume fraction, as given by, $$\phi_O = \frac{\rho_W - \rho_{mixture} + \phi_G(\rho_W - \rho_G)}{\rho_W - \rho_O}. \quad \text{(Eqn. 12)}$$

Comparing this expression for oil fraction, $\Phi_O$, to that derived when assuming that only oil and water are present, $\Phi^*_O$, shows how the presence of gas results in an over prediction of the net oil, as given by, $$\phi_O = \phi_O^* - \phi_G \frac{\rho_W - \rho_G}{\rho_W - \rho_O}. \quad \text{(Eqn. 13)}$$

Figure 12:
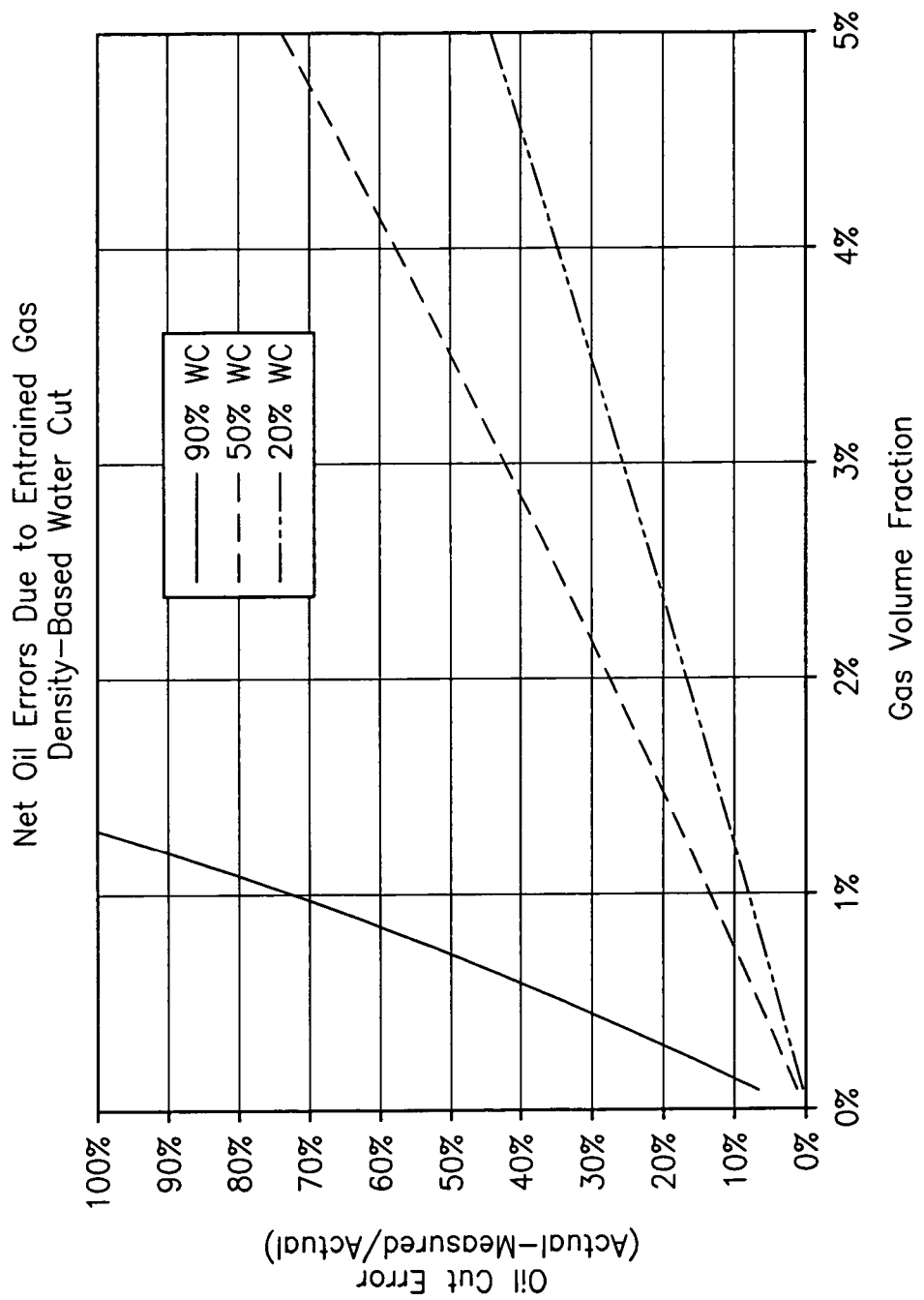
FIG. 12 is a plot depicting the effect of free gas on interpreted oil cut using a density-based water cut measurement, embodying the present invention.

FIG. 12 shows the error in interpreted oil fraction of the liquid stream due to the presence of a relatively small, but unknown, amount of entrained gas in an oil/water stream. The example considers oil with a specific gravity of 0.85 and the water a specific gravity of 1. As discussed herein, it is assumed that the coriolis meter accurately reports mixture density and the densities of the oil, water, and gas phases are known. As shown in FIG. 12, the presence of the free gas has a significant impact on the interpreted oil cut of the liquid stream, and hence the net oil. Although still significant at low water cuts, the impact of entrained gases dominates the measurement at high water cuts. As shown, 1% entrained gas results in an approximately 2× over-reporting of net oil at 90% watercut. These errors are removed if the free gas is accurately measured and accounted for when calculating the oil fraction.

Using the relationship discussed above, the following correction factor can be summed directly with the output of the fluid cut meter (FIG. 1b and FIG. 9) to yield a more accurate determination of the oil cut in the presence of free gas:

$$-\phi_G \frac{\rho_W - \rho_G}{\rho_W - \rho_O}. \quad \text{(Eqn. 14)}$$

This correction factor can be applied by the signal processor 120 of FIG. 1b as the equation:

$$\Phi_{compensated} = \Phi_{liquid1} - \phi_G \frac{\rho_{liquid2} - \rho_G}{\rho_{liquid2} - \rho_{liquid1}}, \quad \text{(Eqn. 15)}$$

where: $\Phi_{compensated}$ is the compensated fluid cut of the first liquid, $\Phi_{liquid1}$ is the fluid cut of the liquid provided by the fluid cut measurement device 120, $\Phi_G$ is the concentration of the gas provided by the GVF measurement device 116, $\rho_{liquid1}$ is a density of the first liquid, $\rho_{liquid2}$ is a density of a second liquid in the mixture, and $\rho_G$ is a density of the gas. The constants $\rho_{liquid1}$ and $\rho_{liquid2}$ are common to those required for base line calibration of the Coriolis meter. The constant $\rho_G$ may be estimated.

Resonant Microwave Oscillator Fluid Cut Devices

It should be appreciated that resonant microwave oscillators leverage the difference in relative permittivity between oil and water to determine the water cut, wherein the relative permittivity of a medium, $\epsilon_i$, can be viewed as a measure of speed at which microwaves propagate through a given medium, $V_i$, as compared to the speed of microwaves in a vacuum, c and may be given by, $$V_i = \frac{c}{\sqrt{\epsilon_i}} \quad \text{(Eqn. 16)}$$

Thus, the speed of propagation of microwaves decreases in media with increasing permittivity. For multi-component mixtures, the average propagation velocity is a volumetrically-weighted function of the propagation velocities of the components and may be given by, $$V_{mix} = \frac{1}{\sum \frac{\phi_i}{V_i}} = \frac{c}{\sum \phi_i \sqrt{\epsilon_i}} \quad \text{(Eqn. 17)}$$

Water typically has a relative permittivity of 68-80, with crude oil typically ranging from 2.2 to 2.6. Since the water phase has the largest relative permittivity, microwave propagation velocity decreases with increasing water cut.

For a fixed geometry resonant cavity, the resonant frequency is proportional to the speed of propagation of microwaves inside the cavity. Thus, for a cavity filled with a mixture of oil and water, increasing water cut, decreases the propagation speed, and in turn, decreases the resonant frequency. Thus, once calibrated, the frequency of the resonant microwave cavity is a measure of the speed of propagation and thus the relative permittivity of the mixture inside the cavity, $\epsilon_{mix}$. The oil cut of an oil/water mixture is related to the measured permittivity and the permittivities of the water and oil components by:

$$\phi_O^* = \frac{\sqrt{\epsilon_W} - \sqrt{\epsilon_{mixture}}}{\sqrt{\epsilon_W} - \sqrt{\epsilon_O}}. \quad \text{(Eqn. 18)}$$

Again, under the no gas assumption, there is a direct relation between the interpreted oil cut and water cut and my be given by, $$\phi_W^* = 1 - \phi_O^* = \frac{\sqrt{\epsilon_{mixture}} - \sqrt{\epsilon_O}}{\sqrt{\epsilon_W} - \sqrt{\epsilon_O}}. \quad \text{(Eqn. 19)}$$

Similar to density-based watercut devices, resonant microwave oscillators continue to operate in the presence of gas, with their ability to independently determine watercut degraded. The effect of gas can be incorporated by allowing for the presence of a third component in the analysis. Gas has a relative permittivity of ~1, an as such, free gas appears similar to oil and results in the resonant microwave oscillator over-reporting the actual oil cut. Using the above relations, the relationship between the actual oil cut, $\Phi_O$, and that interpreted assuming no gas, $\Phi_O^*$, may be given by, $$\phi_O = \phi_O^* - \phi_G \frac{\sqrt{\epsilon_W} - \sqrt{\epsilon_G}}{\sqrt{\epsilon_W} - \sqrt{\epsilon_O}}. \quad \text{(Eqn. 20)}$$

Figure 13:
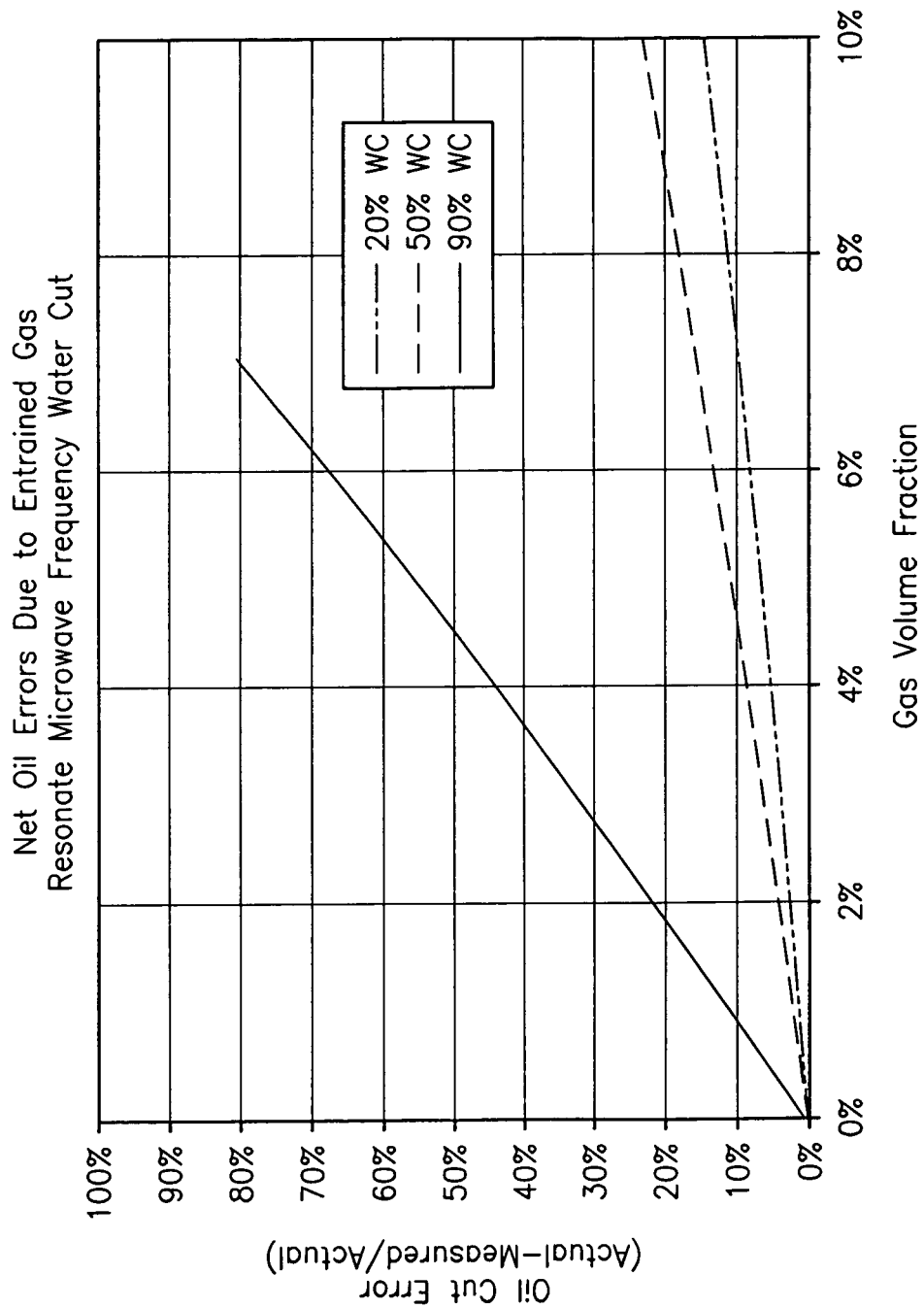
FIG. 13 is a plot depicting the effect of free gas on interpreted oil cut using a resonant microwave cavity device, embodying the present invention.

FIG. 13 shows the error in interpreted net oil cut that would be incurred by a resonant microwave oscillator due to the presence of a small, but unknown, amount of gas. The relative permittivity of the water, oil and gas phases were assumed to be 66, 2.2, and 1 respectively, in this example. The error is calculated using the equation developed above. The predicted errors, as functions of the water cut and gas volume fraction, are broadly consistent with those given in the literature. Although the resonant microwave oscillators are typically less sensitive to free air than density based devices, the effect on net oil can be significant, with the largest proportional errors due to unrecognized free gas occurring at the highest water cuts. These errors are removed if the free gas is accurately measured and accounted for when calculating the oil fraction.

Using the relationship discussed above, the following correction factor can be summed directly with the output of the fluid cut meter (FIG. 1b and FIG. 9) to yield a more accurate determination of the oil cut in the presence of free gas.

$$-\phi_G \frac{\sqrt{\epsilon_W} - \sqrt{\epsilon_G}}{\sqrt{\epsilon_W} - \sqrt{\epsilon_O}}. \quad \text{(Eqn. 21)}$$

This correction factor can be applied by the signal processor 120 of FIG. 1b as the equation:

$$\Phi_{compensated} = \Phi_{liquid1} - \phi_G \frac{\sqrt{\epsilon_{liquid2}} - \sqrt{\epsilon_G}}{\sqrt{\epsilon_{liquid2}} - \sqrt{\epsilon_{liquid1}}}, \quad \text{(Eqn. 22)}$$

where: $\Phi_{compensated}$ is the compensated fluid cut of the liquid, $\Phi_{liquid1}$ is the fluid cut of the liquid provided by the fluid cut device 130, $\Phi_G$ is the concentration of the gas provided by the GVF device 116, $\epsilon_{liquid1}$ is a permittivity of the first liquid, $\epsilon_{liquid2}$ is a permittivity of a second liquid in the mixture, and $\epsilon_G$ is a permittivity of the gas. The constants $\epsilon_{liquid1}$, and $\epsilon_{liquid2}$, are common to those required for base line calibration of resonant microwave oscillating devices. The constant $\epsilon_G$ may be estimated.

Microwave Absorption Fluid Cut Devices

The third type of fluid cut device considered is the microwave absorption fluid cut device. Water molecules efficiently absorb microwave energy, whereas hydrocarbons typically do not. Thus, the amount of microwave energy absorbed by a given volume of a mixture of hydrocarbons and water is primarily determined by the water cut of the mixture. Thus, the water cut can be determined by a calibrated measure of microwave absorption, $\alpha$, as follows:

$$\phi_W^* = F(\alpha) \quad \text{(Eqn. 23)}$$

Again, assuming no gas is present, the oil cut may be determined directly from the water cut, as follows:

$$\phi_O^* = 1 - \phi_W^* = F(\alpha), \quad \text{(Eqn. 24)}$$

From a microwave absorption perspective, gas and crude oil are both, non-absorbing components. Therefore, a microwave absorption device will continue to accurately report water cut (i.e. water fraction) in an oil/water mixture with a small but unknown amount of gas. However, although the water cut is reported accurately, the presence of gas still can result in significant over-reporting of net oil cut as may be given by, $$\phi_O = 1 - \phi_W - \phi_G = 1 - F(\alpha) - \phi_G = \phi_O^* - \phi_G, \quad \text{(Eqn. 25)}$$

Figure 14:
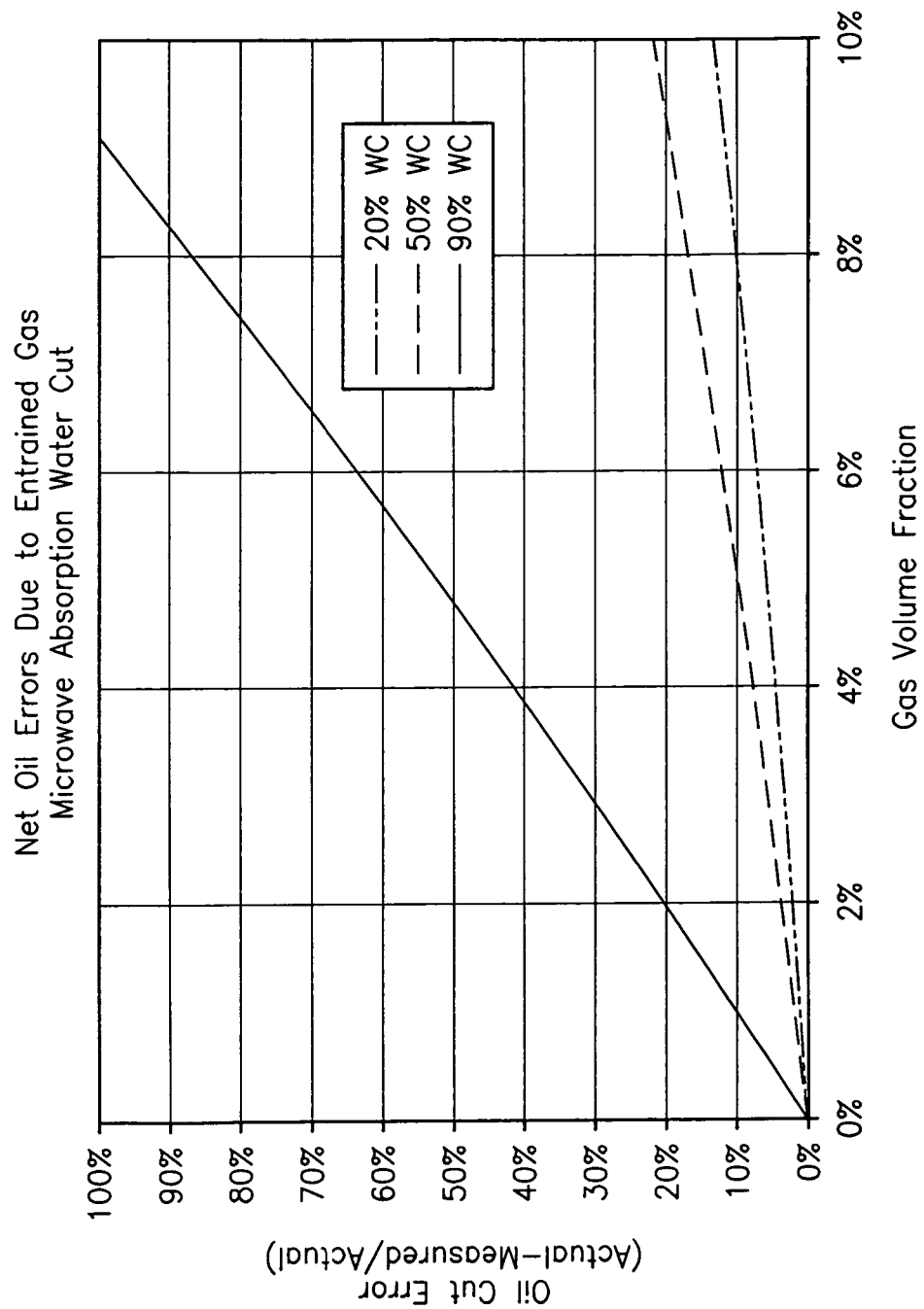
FIG. 14 is a plot depicting the effect of free gas on interpreted oil cut using a microwave absorption device, embodying the present invention.

For example, consider a non-aerated mixture of 90% water, 10% oil stream. A properly calibrated microwave device would accurately report 90% water cut. If this same liquid mixture is then aerated with 10% entrained gas, the resulting mixture would then consist of 81% water, 9% oil and 10% gas by volume. A microwave absorption device would then accurately report a water cut of 81%. However, without knowledge of the amount of gas present, one would then conclude that the mixture was 19% oil, resulting in a nearly 2× over reporting of the oil cut of the stream. FIG. 14 shows the errors in oil cut interpreted using an absorption-based microwave device due to an unrecognized presence of gas as a function gas volume fraction for a range of water cuts. These errors are removed if the free gas is accurately measured and accounted for when calculating the oil fraction. Using the relationship discussed above, the following correction factor can be summed directly with the output of the fluid cut meter (FIG. 1b and FIG. 9) to yield a more accurate determination of the oil cut in the presence of free gas.

$$-\phi_G, \quad \text{(Eqn. 26)}$$

This correction factor can be applied by the signal processor of FIG. 1b as the equation:

$$\Phi_{compensated} = \Phi_{liquid1} - \Phi_G, \quad \text{(Eqn. 27)}$$

where: $\Phi_{compensated}$ is the compensated fluid cut of the first liquid, $\Phi_{liquid1}$ is the fluid cut of the liquid provided by the fluid cut device 9, and $\Phi_G$ is the concentration of the gas provided by the GVF device 10. To illustrate the discussion hereinabove, the following examples are provided.

Velocity Processing

As described in commonly-owned U.S. Pat. No. 6,609,069 to Gysling, entitled "Method and Apparatus for Determining the Flow Velocity Within a Pipe", which is incorporated herein by reference in its entirety, unsteady pressures along a pipe caused by coherent structures (e.g., turbulent eddies and vortical disturbances) that convect with a fluid (e.g., gas flow 302) flowing in the pipe 304, contain useful information regarding parameters of the fluid.

Figure 15:
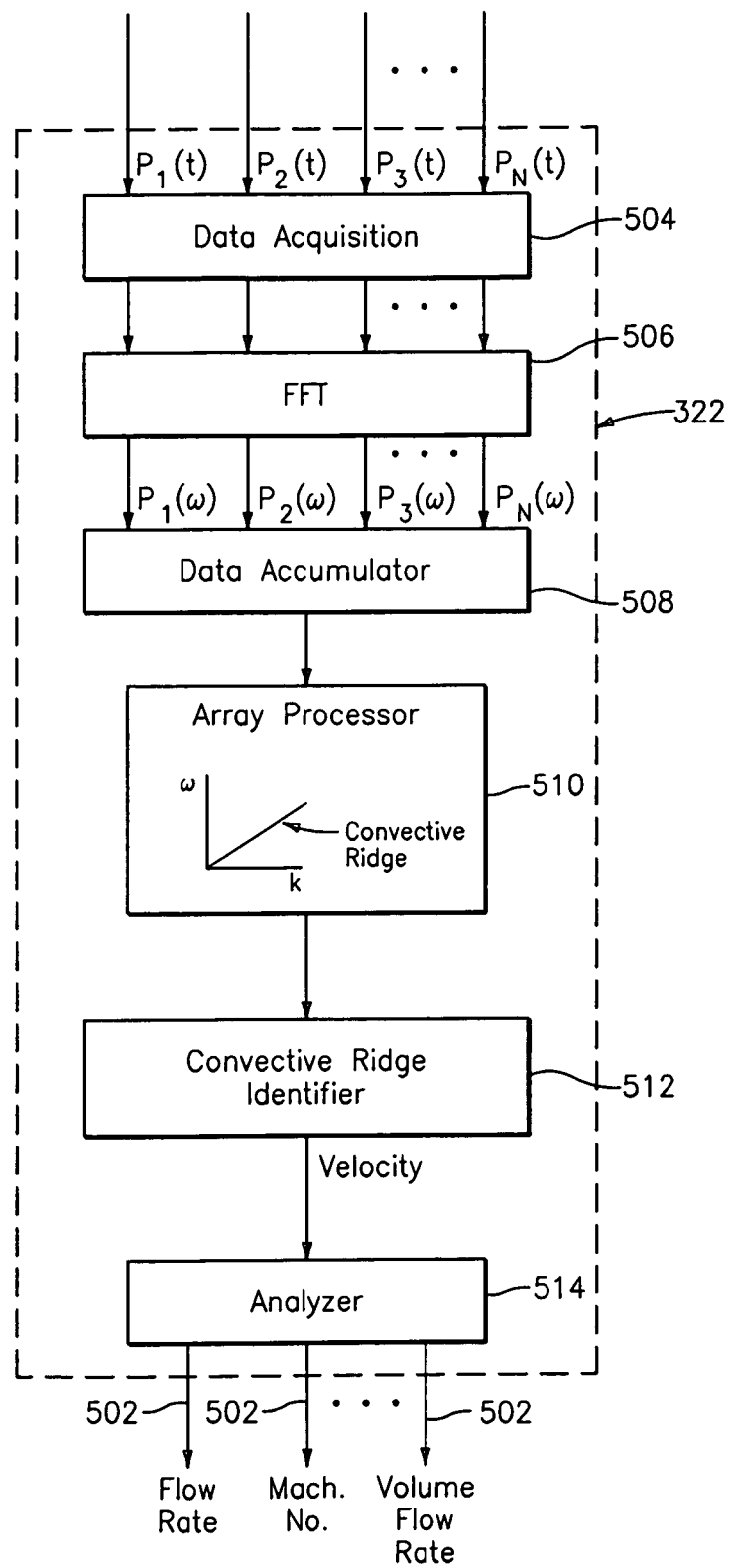
FIG. 15 is a block diagram of a first embodiment of a flow logic used in the apparatus of the present invention.
Figure 16:
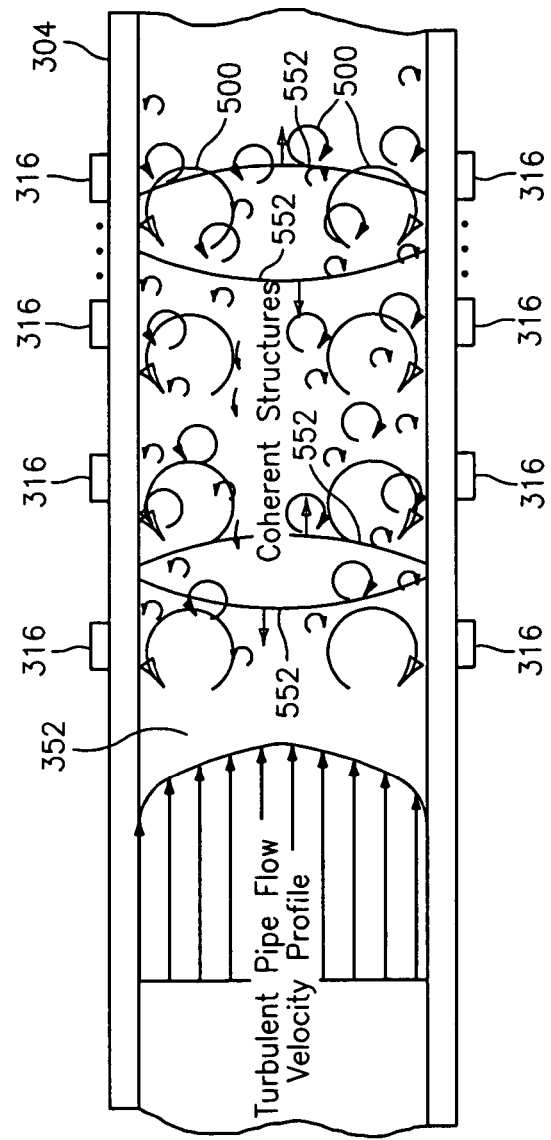
FIG. 16 is a cross-sectional view of a pipe having coherent structures therein.

Referring to FIG. 15, an example of flow logic 322 is shown. As previously described, the array 314 of at least two sensors 316 located at two locations $x_1$, $x_2$ axially along the pipe 304 sense respective stochastic signals propagating between the sensors 316 within the pipe 304 at their respective locations. Each sensor 316 provides a signal indicating an unsteady pressure at the location of each sensor 316, at each instant in a series of sampling instants. One will appreciate that the array 314 may include more than two sensors 316 distributed at locations $x_1 \ldots x_N$. The pressure generated by the convective pressure disturbances (e.g., eddies 500, see FIG. 16) may be measured through strained-based sensors 316 and/or pressure sensors 316. The sensors 316 provide analog pressure time-varying signals $P_1(t), P_2(t), P_3(t) \ldots P_N(t)$ to the signal processor 318, which in turn applies selected ones of these signals $P_1(t), P_2(t), P_3(t), \ldots P_N(t)$ to the flow logic 322.

The flow logic 322 processes the selected signals $P_1(t), P_2(t), P_3(t), \ldots P_N(t)$ to first provide output signals (parameters) 502 indicative of the pressure disturbances that convect with the fluid (process flow) 302, and subsequently, provide output signals (parameters) 502 in response to pressure disturbances generated by convective waves propagating through the fluid 302, such as velocity, Mach number and volumetric flow rate of the process flow 302. The signal processor 318 includes data acquisition unit 504 (e.g., A/D converter) that converts the analog signals $P_1(t) \ldots P_N(t)$ to respective digital signals and provides selected ones of the digital signals $P_1(t) \ldots P_N(t)$ to FFT logic 506. The FFT logic 506 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)-P_N(t)$, may be used. For example, the cross-spectral density and the power spectral density may be used to form a frequency domain transfer functions (or frequency response or ratios) discussed hereinafter.

One technique of determining the convection velocity of the turbulent eddies 500 within the process flow 302 is by characterizing a convective ridge of the resulting unsteady pressures using an array of sensors or other beam forming techniques, similar to that described in U.S Pat. No. 6,889, 562 and U.S. Pat. No. 6,609,069, which are incorporated herein by reference.

A data accumulator 508 accumulates the frequency signals $P_1(\omega)-P_N(\omega)$ over a sampling interval, and provides the data to an array processor 510, which performs a spatial-temporal (two-dimensional) transform of the sensor data, from the xt domain to the k-ω domain, and then calculates the power in the k-ω plane, as represented by a k-ω plot. The array processor 510 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms for use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length. Convective characteristics or parameters have a dispersion relationship that can be approximated by the straight-line equation, $$k=\omega/u, \quad \text{(Eqn. 28)}$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 500 is distributed over a range of length scales and hence temporal frequencies.

To calculate the power in the k-ω plane, as represented by a k-ω plot (see FIG. 17) of either the signals, the array processor 510 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 316.

Figure 17:
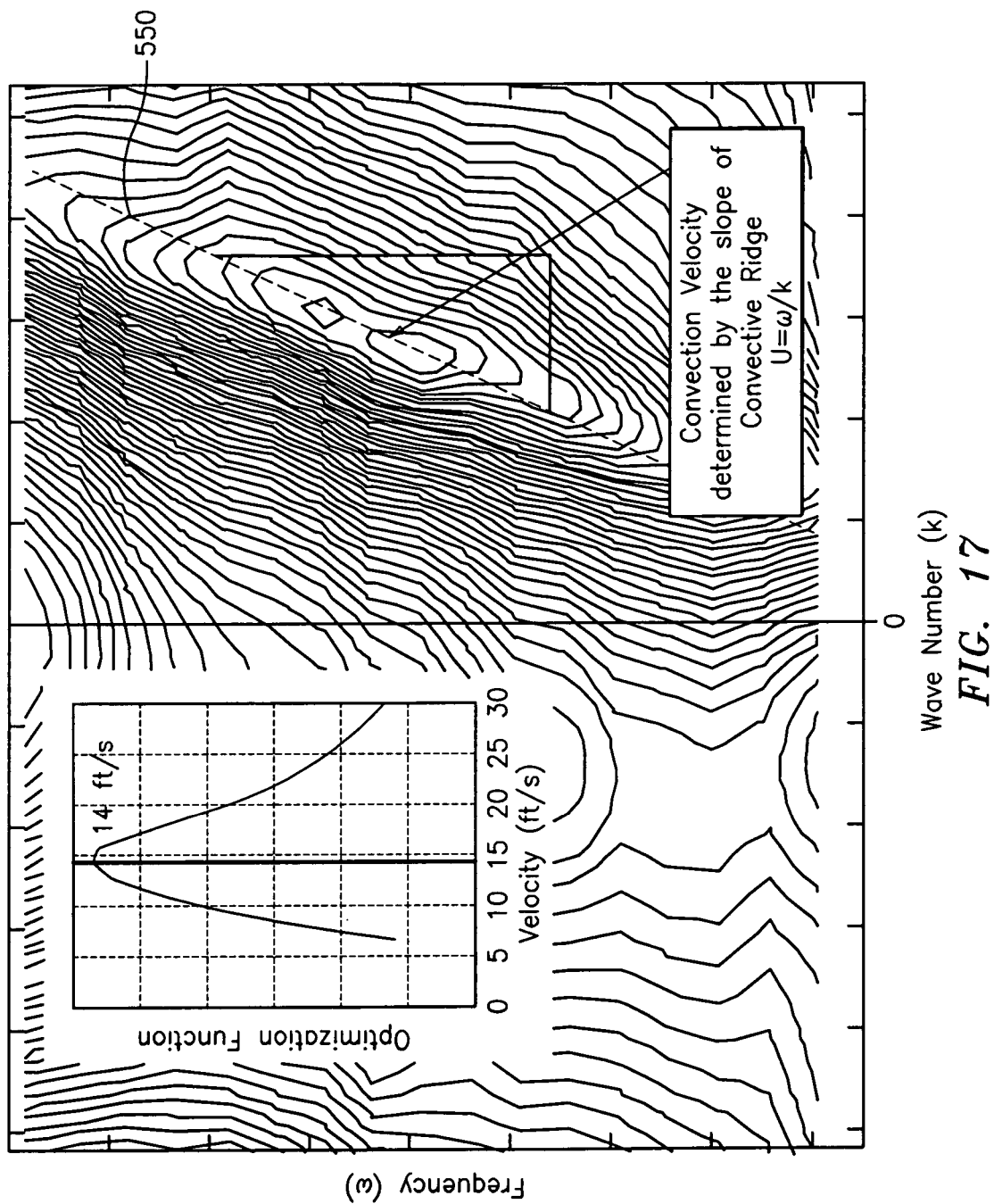
FIG. 17 a k-ω plot of data processed from an apparatus embodying the present invention that illustrates slope of the convective ridge, and a plot of the optimization function of the convective ridge.

The present invention may use temporal and spatial filtering to precondition the signals to effectively filter out the common mode characteristics $P_{common\ mode}$ and other long wavelength (compared to the sensor spacing) characteristics in the pipe 304 by differencing adjacent sensors 316 and retain a substantial portion of the stochastic parameter associated with the flow field and any other short wavelength (compared to the sensor spacing) low frequency stochastic parameters. In the case of suitable turbulent eddies 500 (see FIG. 16) being present, the power in the k-ω plane shown in a k-ω plot of FIG. 17 shows a convective ridge 550. The convective ridge 550 represents the concentration of a stochastic parameter that convects with the flow and is a mathematical manifestation of the relationship between the spatial variations and temporal variations described above. Such a plot will indicate a tendency for k-ω pairs to appear more or less along a line 550 with some slope, wherein the slope indicates the flow velocity.

Once the power in the k-ω plane is determined, a convective ridge identifier 512 uses one or another feature extraction method to determine the location and orientation (slope) of any convective ridge 550 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 512 provides information about the different trial convection velocities, information referred to generally as convective ridge information. The analyzer 514 examines the convective ridge information including the convective ridge orientation (slope) and assuming the straight-line dispersion relation given by k=ω/u, the analyzer 514 determines the flow velocity, Mach number and/or volumetric flow, which are output as parameters 502. The volumetric flow is determined by multiplying the cross-sectional area of the inside of the pipe with the velocity of the process flow. It should be appreciated that some or all of the functions within the flow logic 322 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 18:
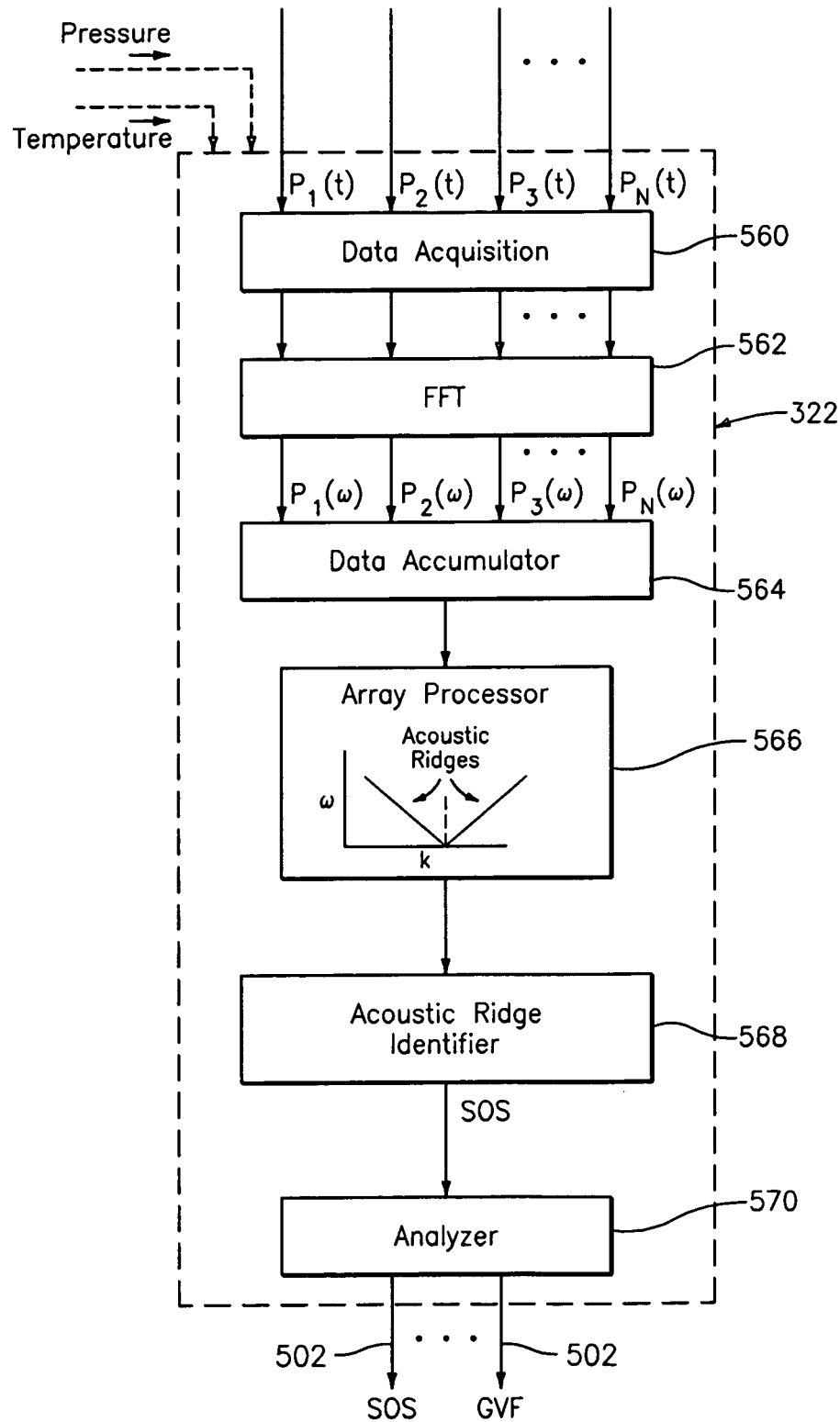
FIG. 18 is a block diagram of a second embodiment of a flow logic used in the apparatus of the present invention.

Referring to FIG. 24, another example of flow logic 322 is shown. While the examples of FIG. 15 and FIG. 18 are shown separately, it is contemplated that the flow logic 322 may perform all of the functions described with reference to FIG. 15 and FIG. 18. As previously described, the array 314 of at least two sensors 316 located at two at least two locations $x_1$, $x_2$ axially along the pipe 304 sense respective stochastic signals propagating between the sensors within the pipe at their respective locations. Each sensor 316 provides a signal indicating an unsteady pressure at the location of each sensor 316, at each instant in a series of sampling instants. One will appreciate that the sensor array 314 may include more than two pressure sensors 316 distributed at locations $x_1 \ldots x_N$. The pressure generated by the acoustic pressure disturbances (e.g., acoustic waves 552, see FIG. 16) may be measured through strained-based sensors and/or pressure sensors. The sensors 316 provide analog pressure time-varying signals $P_1(t), P_2(t), P_3(t), \ldots P_N(t)$ to the flow logic 322. The flow logic 322 processes the signals $P_1(t), P_2(t), P_3(t), \ldots P_N(t)$ from selected ones of the sensors 316 to first provide output signals indicative of the speed of sound propagating through the fluid (process flow) 302, and subsequently, provide output signals in response to pressure disturbances generated by acoustic waves propagating through the process flow 302, such as velocity, Mach number and volumetric flow rate of the process flow 302.

The signal processor 318 receives the pressure signals from the array 314 of sensors 316 and a data acquisition unit 560 digitizes selected ones of the pressure signals $P_1(t) \ldots P_N(t)$ associated with the acoustic waves 552 propagating through the pipe 304. Similarly to the FFT logic 506 of FIG. 15, an FFT logic 562 calculates the Fourier transform of the selected digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. A data accumulator 564 accumulates the frequency signals $P_1(\omega) \ldots P_N(\omega)$ over a sampling interval, and provides the data to an array processor 566, which performs a spatial-temporal (two-dimensional) transform of the sensor data, from the xt domain to the k-ω domain, and then calculates the power in the k-ω plane, as represented by a k-ω plot.

To calculate the power in the k-ω plane, as represented by a k-ω plot (see FIG. 19) of either the signals or the differenced signals, the array processor 566 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 316. In the case of suitable acoustic waves 552 being present in both axial directions, the power in the k-ω plane shown in a k-ω plot of FIG. 19 so determined will exhibit a structure that is called an acoustic ridge 600, 602 in both the left and right planes of the plot, wherein one of the acoustic ridges 600 is indicative of the speed of sound traveling in one axial direction and the other acoustic ridge 602 is indicative of the speed of sound traveling in the other axial direction. The acoustic ridges 600, 602 represent the concentration of a stochastic parameter that propagates through the flow and is a mathematical manifestation of the relationship between the spatial variations and temporal variations described above. Such a plot will indicate a tendency for k-ω pairs to appear more or less along a line 600, 602 with some slope, the slope indicating the speed of sound. The power in the k-ω plane so determined is then provided to an acoustic ridge identifier 568, which uses one or another feature extraction method to determine the location and orientation (slope) of any acoustic ridge present in the left and right k-ω plane. The velocity may be determined by using the slope of one of the two acoustic ridges 600, 602 or averaging the slopes of the acoustic ridges 600, 602.

Finally, information including the acoustic ridge orientation (slope) is used by an analyzer 570 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow. Similar to the array processor 510 of FIG. 15, the array processor 566 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

Figure 19:
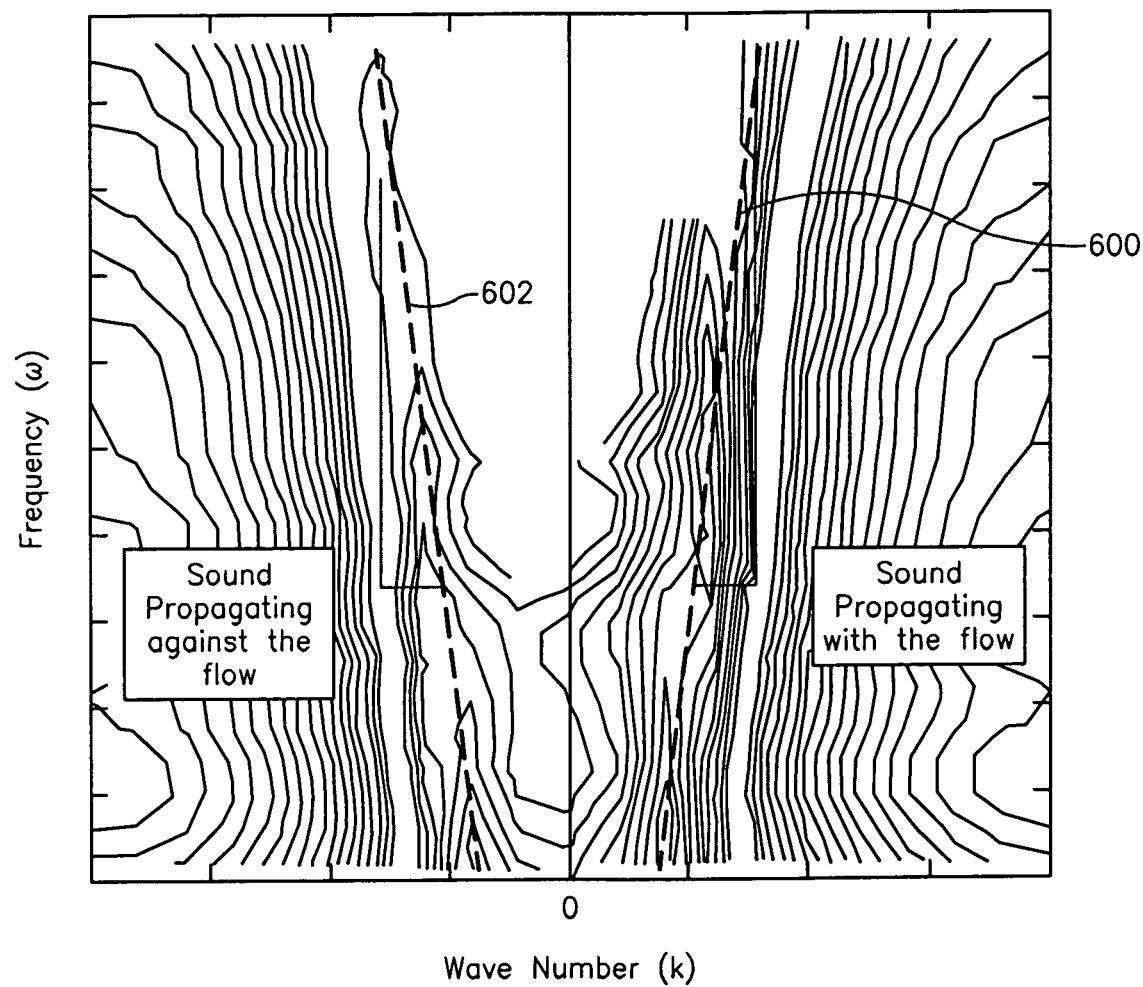
FIG. 19 a k-ω plot of data processed from an apparatus embodying the present invention that illustrates slope of the acoustic ridges.

One such technique of determining the speed of sound propagating through the process flow 302 is using array processing techniques to define an acoustic ridge in the k-ω plane as shown in FIG. 19. The slope of the acoustic ridge is indicative of the speed of sound propagating through the process flow 302, wherein the speed of sound (SOS) is determined by applying sonar arraying processing techniques to determine the speed at which the one dimensional acoustic waves propagate past the axial array of unsteady pressure measurements distributed along the pipe 304. The flow logic 322 of the present embodiment measures the speed of sound (SOS) of one-dimensional sound waves propagating through the process flow 302 to determine the gas volume fraction of the process flow 302. It is known that sound propagates through various mediums at various speeds in such fields as SONAR and RADAR fields. The speed of sound propagating through the pipe 304 and process flow 302 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004; U.S. patent application Ser. No. 09/997,221, filed Nov. 28, 2001, now U.S. Pat. No. 6,587,798; U.S. patent application Ser. No. 10/007,749, filed Nov. 7, 2001, and U.S. patent application Ser. No. 10/762,410, filed Jan. 21, 2004, each of which are incorporated herein by reference. It should be appreciated that while the sonar-based flow meter using an array of sensors to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 570 of the flow logic 322 provides output parameters 502 indicative of characteristics of the process flow 302 that are related to the measured speed of sound (SOS) propagating through the process flow 302. For example, to determine the gas volume fraction (or phase fraction), the analyzer 570 assumes a nearly isothermal condition for the process flow 302. As such the gas volume fraction or the void fraction is related to the speed of sound by the following quadratic equation:

$$Ax^2 + Bx + C = 0, \quad (\text{Eqn. 29})$$

wherein x is the speed of sound, $A = 1 + rg/rl*(K_{eff}/P - 1) - K_{eff}/P$, $B = K_{eff}/P - 2 + rg/rl$; $C = 1 - K_{eff}/rl*a_{meas}^{\wedge 2}$); Rg=gas density, rl=liquid density, $K_{eff}$=effective K (modulus of the liquid and pipewall), P=pressure, and $a_{meas}$=measured speed of sound. Effectively, $$\text{Gas Volume Fraction (GVF)} = (-B + \text{sqrt}(B^2 - 4*A*C))/(2*A).$$

Alternatively, the sound speed of a mixture can be related to volumetric phase fraction ($\phi_i$) of the components and the sound speed (a) and densities ($\rho$) of the component through the Wood equation, $$\frac{1}{\rho_{mix} a_{mix\infty}^2} = \sum_{i=1}^{N} \frac{\phi_i}{\rho_i a_i^2}, \quad (\text{Eqn. 30})$$

where $$\rho_{mix} = \sum_{i=1}^{N} \rho_i \phi_i.$$

One dimensional compression waves propagating within a process flow 302 contained within a pipe 304 exert an unsteady internal pressure loading on the pipe. Thus, the degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{eff} = \frac{1}{\sqrt{1/a_{mix\infty}^2 + \rho_{mix} \frac{2R}{Et}}}, \quad (\text{Eqn. 31})$$

The mixing rule essentially states that the compressibility of a process flow ($1/(\rho a^2)$) is the volumetrically-weighted average of the compressibilities of the components. For a process flow 302 consisting of a gas/liquid mixture at pressure and temperatures typical of the paper and pulp industry, the compressibility of gas phase is orders of magnitudes greater than that of the liquid. Thus, the compressibility of the gas phase and the density of the liquid phase primarily determine the mixture sound speed, and as such, it is necessary to have a good estimate of the process pressure to interpret the mixture sound speed in terms of the volumetric fraction of entrained gas. The effect of process pressure on the relationship between the sound speed and the entrained air volume fraction is shown in FIG. 13.

As described hereinbefore, the flow logic 322 of the present embodiment includes the ability to accurately determine the average particle size of a particle/air or droplet/air mixture within the pipe 304 and the air to particle ratio. Provided there is no appreciable slip between the air and the solid coal particle, the propagation of one dimensional sound waves through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasingly less valid. For a given average particle size, the increase in slip with frequency causes dispersion, or, in other words, the sound speed of the mixture to change with frequency. With appropriate calibration the dispersive characteristic of a process flow 302 will provide a measurement of the average particle size, as well as, the air to particle ratio (particle/fluid ratio) of the process flow 302.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksoz), which is incorporated herein by reference. The model allows for slip between the local velocity of the continuous fluid phase and that of the particles.

The following relationship can be derived for the dispersive behavior of an idealized fluid particle mixture, $$a_{mix}(\omega) = a_f \sqrt{\frac{1}{1 + \frac{\phi_p \rho_p}{\rho_f \left(1 + \omega^2 \frac{\rho_p^2 v_p^2}{K^2}\right)}}}. \quad (\text{Eqn. 32})$$

In the above relation, the fluid SOS, density ($\rho$) and viscosity ($\phi$) are those of the pure phase fluid, $v_p$ is the volume of individual particles and $\phi_p$ is the volumetric phase fraction of the particles in the mixture.

It should be appreciated that some or all of the functions within the flow logic 36 may be implemented in software (using a microprocessor or computer) and/or firmware, or may be implemented using analog and/or digital hardware, having sufficient memory, interfaces, and capacity to perform the functions described herein. Moreover, while FIG. 15 and FIG. 18 depict two different embodiments of the flow logic 322 to measure various parameters of the flow process, the present invention contemplates that the functions of these two embodiments may be performed by a single flow logic 322. Additionally, the apparatus of the present invention provides a configurable array of sensors for use in determining at least one parameter associated with a fluid. By using a sheet of PVDF having a plurality of sensors disposed thereon, a large number of sensors, and thus a highly configurable array, can be manufactured and installed both quickly and economically.

With the present invention, system reliability is increased because redundant sensors can be created; if a fault is seen on one sensor, another can be activated to replace it. In addition, latent functionality can be created because, with the present invention, the array can be reconfigured to meet the needs of new features without requiring a new set of sensors to be installed. The present invention also allows the array to be configured differently for measuring different parameters or for optimizing measurement of a given parameter. The present invention permits a non-linear aperture by varying the spacing between consecutive sensors in the array. This can be adjusted in real-time to allow for spatial filtering of the signals to overcome conditions (e.g., vibrations) that may otherwise prevent or inhibit the sensing of unsteady pressures within the fluid.

Alternative Sensors

The sensors 316 may include electrical strain gages, optical fibers and/or gratings, ported sensors, ultrasonic sensors, among others as described herein, and may be attached to the pipe 304 by adhesive, glue, epoxy, tape or other suitable attachment means to ensure suitable contact between the sensor and the pipe 304. The sensors 316 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 304. If desired, for certain applications, gratings may be detached from (or strain or acoustically isolated from) the pipe 304 if desired. It is also contemplated that any other strain sensing technique may be used to measure the variations in strain in the pipe 304, such as highly sensitive piezoelectric, electronic or electric, strain gages attached to or embedded in the pipe 304.

In various embodiments of the present invention, a piezoelectronic pressure transducer may be used as one or more of the pressure sensors and it may measure the unsteady (or dynamic or ac) pressure variations inside the pipe 304 by measuring the pressure levels inside the pipe 304. In one embodiment of the present invention, the sensors 316 comprise pressure sensors manufactured by PCB Piezotronics of Depew, N.Y. For example, in one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The sensors 316 may incorporate a built-in MOSFET microelectronic amplifier to convert the high-impedance charge output into a low-impedance voltage signal. The sensors 316 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply. Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves. The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore it is contemplated that each of the sensors 316 may include a piezoelectric sensor that provides a piezoelectric material to measure the unsteady pressures of the flow 302. The piezoelectric material, such as the polymer, polarized fluoropolymer, PVDF, measures the strain induced within the process pipe 304 due to unsteady pressure variations within the flow 302. Strain within the pipe 304 is transduced to an output voltage or current by the attached piezoelectric sensors 316. The PVDF material forming each piezoelectric sensor 316 may be adhered to the outer surface of a steel strap that extends around and clamps onto the outer surface of the pipe 304. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements.
2. Low cost.
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140 C) (co-polymers).

It should be appreciated that some or all of the functions within the flow logic 36 may be implemented in software (using a microprocessor or computer) and/or firmware, or may be implemented using analog and/or digital hardware, having sufficient memory, interfaces, and capacity to perform the functions described herein. Moreover, it should be understood that any of the features, characteristics, alternatives or modifications described regarding a particular embodiment herein may also be applied, used, or incorporated with any other embodiment described herein. Furthermore, although the invention has been described and illustrated with respect to exemplary embodiments thereof, the foregoing and various other additions and omissions may be made therein and thereto without departing from the spirit and scope of the present invention.

What is claimed is:

1. An apparatus for monitoring the performance of a separation process of a multiphase fluid flowing within a pipe, the apparatus comprising:
    a separator device communicated with the pipe to receive the fluid, wherein said separator device separates the fluid into a first component and a second component, wherein the first component is a liquid;
    at least one flow metering device, said at least one flow metering device being associated with said separator to generate meter data responsive to said liquid first component; and
    a processing device, wherein said processing device is in communication with said at least one flow metering device, and is adapted to use the meter data to generate apparatus performance data, and the apparatus is adapted to be selectively responsive to the apparatus performance data to improve performance of the separator.

2. The apparatus of claim 1, further comprising at least one valve associated with the pipe, wherein said processing device is communicated with said at least one valve to allow said processing device to control said at least one valve.

3. The apparatus of claim 1, further comprising a means for introducing at least one of a defoamer and a demister into the pipe, wherein said processing device is communicated with said means for introducing at least one of a defoamer and a demister into the pipe to control said introduction of said at least one of a defoamer and a demister into the pipe.

* * * * *